(12) United States Patent
Nishigaki

(10) Patent No.: US 8,315,987 B2
(45) Date of Patent: Nov. 20, 2012

(54) DATABASE MANAGEMENT APPARATUS AND RECORDING MEDIUM WITH DATABASE MANAGEMENT PROGRAM RECORDED THEREON

(75) Inventor: Masaki Nishigaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 13/036,136

(22) Filed: Feb. 28, 2011

(65) Prior Publication Data

US 2011/0238630 A1    Sep. 29, 2011

(30) Foreign Application Priority Data

Mar. 26, 2010    (JP) .................................. 2010-073197

(51) Int. Cl.
*G06F 17/30* (2006.01)
(52) U.S. Cl. ........................................ 707/679; 707/649
(58) Field of Classification Search .................. 707/649, 707/679, 999.008
See application file for complete search history.

(56) References Cited

U.S. PATENT DOCUMENTS

| | | | |
|---|---|---|---|
| 5,201,044 A | 4/1993 | Frey, Jr. et al. | |
| 6,081,875 A | 6/2000 | Clifton et al. | |
| 7,996,611 B2 * | 8/2011 | Nakagawa et al. | 711/114 |
| 2005/0160087 A1 | 7/2005 | Nishigaki | |
| 2011/0161299 A1 * | 6/2011 | Prahlad et al. | 707/649 |

FOREIGN PATENT DOCUMENTS

| | | |
|---|---|---|
| JP | 7-73087 | 3/1995 |
| JP | 2001-520779 | 10/2001 |
| WO | WO 2004/023308 | 3/2004 |

OTHER PUBLICATIONS http://www.shoeisha.com/mag.windev/pdf/870603/windev0603_144_SQLServer.pdf#11 SQL Server 2005.

* cited by examiner

*Primary Examiner* — Cheryl Lewis
(74) *Attorney, Agent, or Firm* — Staas & Halsey LLP

(57) ABSTRACT

A database management apparatus is provided with a setting unit that receives a snapshot request and records information indicating an extraction range to a memory, an extraction unit that sequentially extracts records and records the extracted records to another area, a monitoring unit that records information indicating an extraction-completed area and an extraction-remaining area, an update unit that judges whether a record targeted by an update instruction for update by a subsequent transaction is in the extraction-completed area, updates the update target record in the extraction-completed area if in the extraction-completed area, and records a map of the update target record in the extraction-remaining area to an area outside the extraction range and updates the map if in the extraction-remaining area, and a restore unit that updates the update target record to be the same as the map, after extraction of the update target record is completed.

14 Claims, 15 Drawing Sheets

DATABASE MANAGEMENT APPARATUS AND RECORDING MEDIUM WITH DATABASE MANAGEMENT PROGRAM RECORDED THEREON

CROSS-REFERENCE TO RELATED APPLICATIONS

This application is based upon and claims the benefit of priority of the prior Japanese Patent Application no. 2010-73197, filed on Mar. 26, 2010, the entire contents of which are incorporated herein by reference.

FIELD

The present invention relates to a database management apparatus.

BACKGROUND

Database management systems require acquisition of snapshots at given points in time during data update. Snapshots are used, for example, for data retention (backup) or for referencing data content at arbitrary points in time. Techniques used in snapshot acquisition include, for example, mirroring and techniques for maintaining read consistency using logging or mapping.

With techniques using logging, operations on a database are recorded as log data (or journal data), and snapshots can be acquired by going back to the points in time of the log data (UNDO logging).

With techniques using mapping, table data in a database has a recordable structure, and new records are added in the case of either INSERT or UPDATE, for example. Multiple transactions including access to the same database can thereby reference not only current records in the database but also records at given points in time dating back from the present (MVCC).

Also, with mirroring, a (replica/duplicate) database with exactly the same content as the main (master) database is created. By thus duplicating the databases, and then isolating one of the databases at a given point in time and referencing the isolated database, a snapshot at that point in time can be acquired.

Non-Patent Document 1: Ch. 13 Oracle Architecture (Supplement), [online], [searched May 22, 2009], <http://www.shoeisha.com/mag/windev/pdf/870603/windev0603_144_SQLServer.pdf>

With the above UNDO logging, a memory area for log data is necessary. Also, the user needs to tune the size of the log data area with consideration for transaction volume. With MVCC, data area is consumed whenever the database is updated, even when referencing or snapshot acquisition is not performed. As a result, the data area is constricted. Also, unnecessary data area needs to be periodically recovered, with the CPU and I/O resources being used in recovery. With the above snapshot acquisition by isolating duplicated databases, a volume disk needs to be procured, configured and managed. In the case where snapshot acquisition is requisite for any of the above conventional schemes, complex processing is thus necessary, resulting in much waste in procurement and use of computer resources and operational management of users.

SUMMARY

A database management apparatus disclosed in the present application is provided with a setting unit that receives a snapshot request requesting that a record in a database on a recording medium at a designated point in time be extracted and saved to another area, and records information indicating an extraction range of data to be extracted in the recording medium to a memory, an extraction unit that sequentially extracts records inside the extraction range, and records the extracted records to the other area, a monitoring unit that records information indicating an extraction-completed area with respect to which record extraction in the extraction range by the extraction unit has been completed and an extraction-remaining area with respect to which record extraction in the extraction range has yet to be performed to the memory on a timely basis, a subsequent update unit that judges, in a case where an instruction to update a record inside the extraction range by a subsequent transaction started after the designated point in time is received during the extraction process by the extraction unit, whether the record targeted by the update instruction is in the extraction-completed area or in the extraction-remaining area with reference to the memory, and, if the update target record is in the extraction-completed area, updates the update target record in the extraction-completed area, and, if the update target record is in the extraction-remaining area, records a map of the update target record in the extraction-remaining area to an area outside the extraction range and updates the map, and a restore unit that updates the update target record inside the extraction range to be the same as the map recorded and updated outside the extraction range, after the update target record inside the extraction range has been extracted by the extraction unit.

The object and advantages of the invention will be realized and attained by means of the elements and combinations particularly pointed out in the claims.

It is to be understood that both the foregoing general description and the following detailed description are exemplary and explanatory only and are not restrictive of the invention as claimed.

DESCRIPTION OF THE EMBODIMENTS

First Embodiment

Exemplary System Configuration

Figure 1:
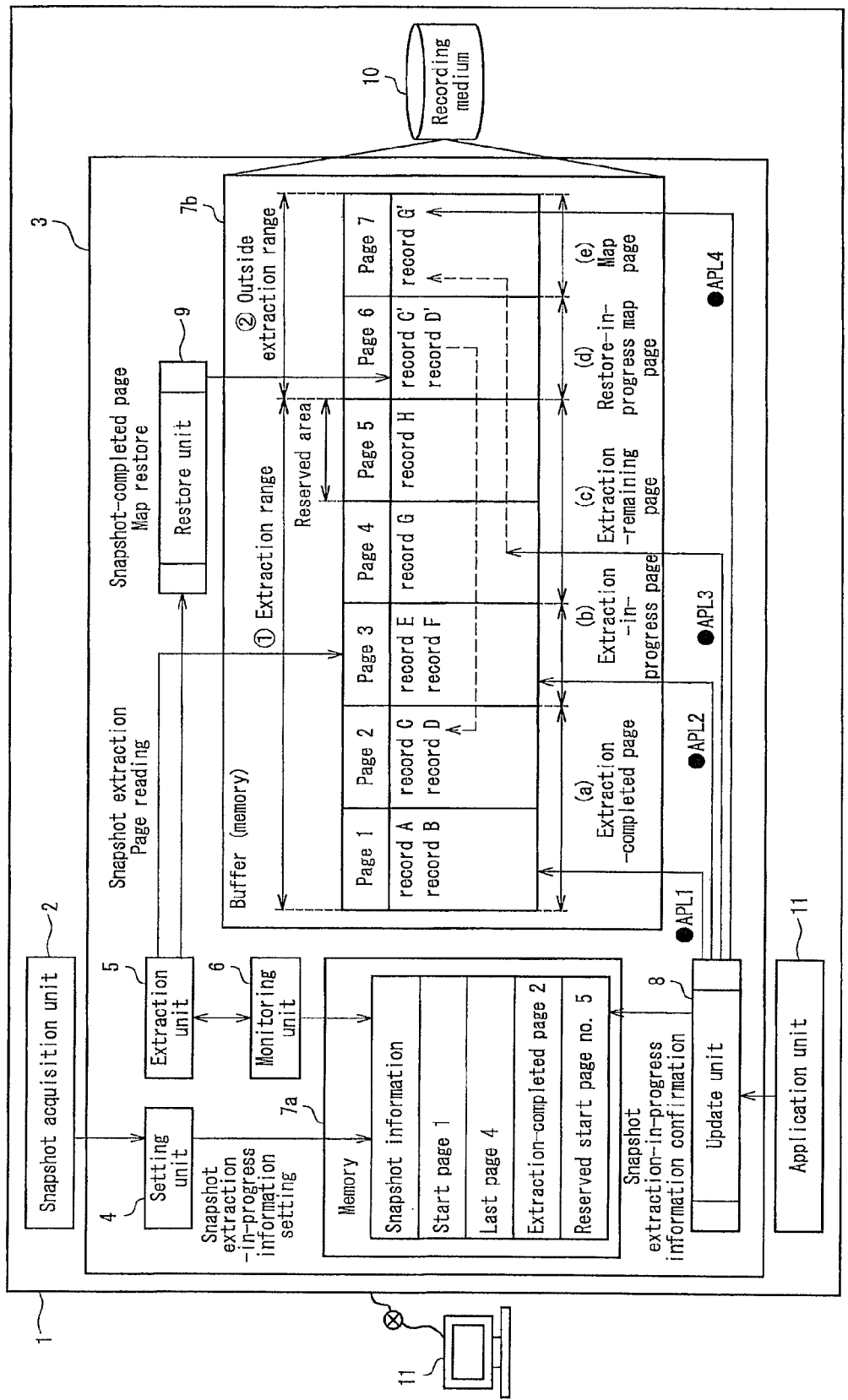
FIG. 1 depicts an exemplary configuration of a database server according to a first embodiment.

FIG. 1 depicts an exemplary configuration of a database server according to a first embodiment. In the example depicted in FIG. 1, a database server 1 includes a snapshot acquisition unit 2, a database management apparatus 3, an update application unit 11 and a recording medium 10 for having data of the database recorded thereon. The recording medium 10 is a disk medium for example. The database management apparatus 3 receives a snapshot request from the snapshot acquisition unit 2, extracts data of a designated range at a designated point in time from a database on the recording medium 10 as a snapshot, and saves the extracted data to another area. The application unit 11 executes a transaction that includes accessing the database. The application unit 11 transmits a database operation instruction to the database management apparatus 3 at the time of database access in the transaction. The database management apparatus 3 accesses the database on the recording medium 10 based on the operation instruction from the application unit 11. The database management apparatus 3 may, for example, be incorporated into the database server 1 as a device for realizing at least some of the functions of a database management system (DBMS).

The database management apparatus 3 is provided with a setting unit 4, an extraction unit 5, a monitoring unit 6, a memory 7a, a buffer 7b and an update unit 8. The setting unit 4 receives a snapshot request requesting that a record in the database on the recording medium 10 at a designated point in time be extracted and saved to another area, and records information indicating an extraction range of records to be extracted in the recording medium 10 to the memory 7a. The extraction unit 5 sequentially extracts records in this extraction range, and records the extracted records to the other area (not depicted).

The monitoring unit 6 monitors the extraction process by the extraction unit 5, and records information indicating an extraction-completed area with respect to which record extraction in the extraction range has been completed and an extraction-remaining area with respect to which record extraction in the extraction range has yet to be performed to the memory 7a on a timely basis.

The update unit 8 receives an update instruction to update a record in the database from the application unit 11. Note that, here, update instructions include an INSERT command and a DELETE command in addition to an UPDATE command. The update unit 8 judges, in the case where an update instruction for a record inside the extraction range to be updated by a subsequent transaction started after the designated point in time is received during the extraction process, whether the record targeted by the update instruction is in the extraction-completed area or in the extraction-remaining area with reference to the memory 7a. If the update target record is in the extraction-completed area, the update unit 8 updates the update target record in the extraction-completed area, and if the update target record is in the extraction-remaining area, the update unit 8 records a map of the update target record in the extraction-remaining area to an area outside the extraction range and updates this map. A restore unit 9 updates the update target record inside the extraction range to be the same as the map recorded and updated outside the extraction range, after extraction of the record in the extraction range by the extraction unit 5 in the extraction process is completed.

According to the configuration depicted in FIG. 1, the database management apparatus 3, on receiving a snapshot acquisition instruction, thus records a data extraction range, an extraction-completed area and an extraction-remaining area to a memory. In the case where an update instruction for a record in the extraction range to be updated by a subsequent transaction is received, it can thereby be determined whether the update target record is in the extraction-completed area or the extraction-remaining area, and the update operation can be controlled based on the determination result. In the example depicted in FIG. 1, the update unit 8 directly updates the record inside the extraction range if the update by the subsequent transaction involves updating a record in the extraction-completed area (e.g., APL1). If the update by the subsequent transaction involves updating a record in the extraction-remaining area (e.g., APL3), the update unit 8 creates a map of the update target record and updates this map, and after completion of snapshot extraction, the restore unit 9 is able to restore the updated map to the update target record. As a result, data consistency in snapshot acquisition can be ensured with simple processing. That is, computer resources used and operational management of users can be reduced in database snapshot acquisition.

For example, the recording of logs showing the database operation history and the recording of maps whenever the database in updated is no longer necessary. With the configuration depicted in FIG. 1, a map is created when a subsequent transaction updates a record in the extraction-remaining area in snapshot acquisition, allowing multiple records (maps) to be efficiently managed in a timely manner. As a result, constriction of disk capacity and memory area can be avoided.

Description of Snapshots

Snapshot acquisition in the present embodiment involves extracting data recorded on a recording medium (e.g., disk or memory) at given designated points in time, and saving the extracted data to a recording area. Snapshot acquisition is, for example, executed in order to backup data and reference data at arbitrary points in time (e.g., batches).

In snapshot acquisition, the range of data to be extracted (extraction range) preferably is appropriately set according to purpose, and is not particularly limited. For example, the extraction range may be a group of related tables in a DBMS (e.g., data structure instance (DSI)), or may be a single table. The database targeted for a snapshot is a set of data (information) systematically recorded on a recording medium, and the format thereof is not particularly limited. In the present embodiment, a relational database (RDB) that manages tabular data will be described as an example.

In the present embodiment, data consistency is ensured in the case where updating on a database is instructed by a separate transaction (application) during snapshot acquisition on the database. Note that the mechanism for ensuring data consistency in the case of a snapshot being requested by a separate transaction during updating on the database by a transaction will be described later in a second embodiment. Exemplary transactions (applications) include an application for backing up a database resource at a specified time using job schedule management.

Exemplary Record Management Method

Figure 2A:
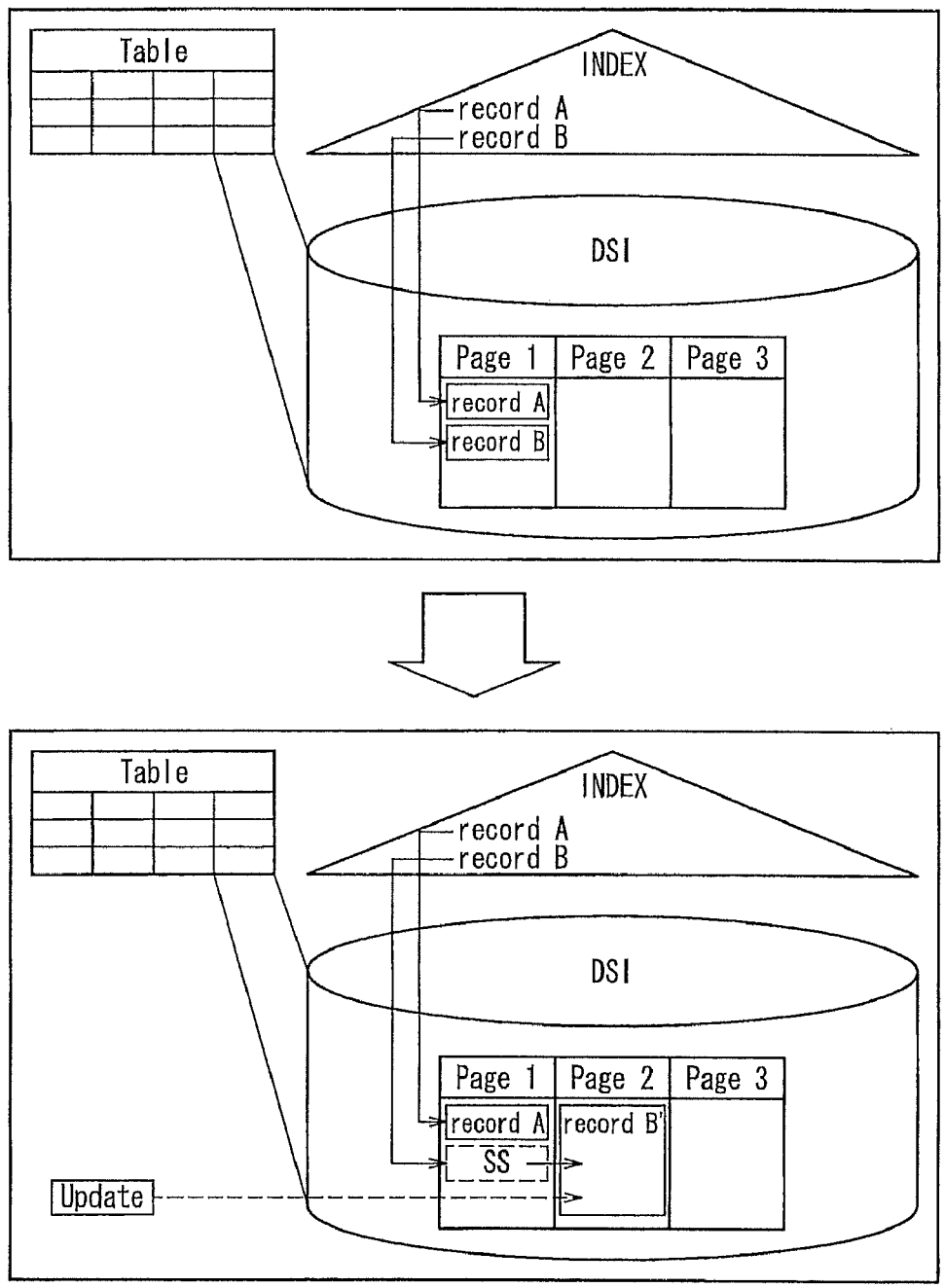
FIG. 2A is for describing an exemplary database record management method.

Here, a record management method of the present embodiment will be described. Note that the following data management method is intended as an example, and the data management method is not limited thereto. FIG. 2A is for describing an exemplary database record management method. In the example depicted in the upper half of FIG. 2A, database data is managed in units of individual records. The area of the recording medium is partitioned into pages. A record is a unit of information handled by a database, and may be either variable length or fixed length. For example, data equivalent to a single line (logical line) in a logical table can be set as a single record. A page is a block (I/O block) partitioning the area of the recording medium, and in the present embodiment, the area of the recording medium is, as an example, managed in units of pages. At the timing at which an image is inserted, updated or deleted, an image of the state-in-progress can be preserved by achieving exclusion with respect to the record image. That is, exclusion control can be performed such that third parties cannot reference the same record at the same time.

In the example depicted in FIG. 2A, an index points to actual records so as to enable efficient data searches. That is, pointers pointing to the addresses of actual records are recorded in the index. Also, as depicted in the bottom half of FIG. 2A, if a variable-length record increases in size as a result of being updated and no longer fits on the page, the record can be stored on a new page. In this case, the pre-update record is used as a stepping stone (SS in FIG. 2A) to point to the post-update record. The post-update record can thereby be retrieved without rewriting the pointer to the record in the index.

Figure 2B:
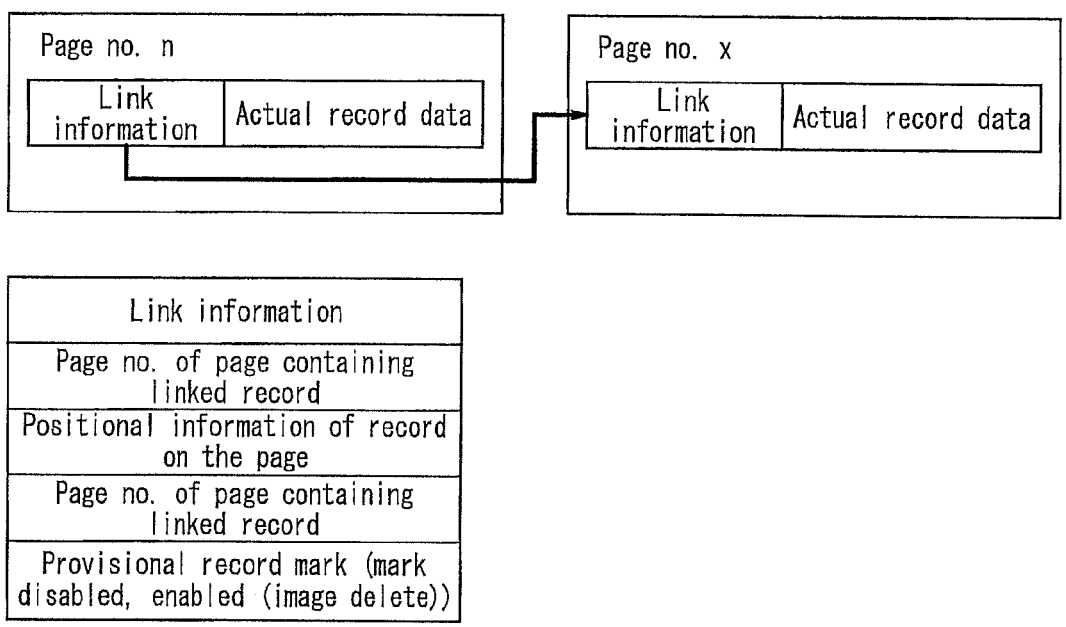
FIG. 2B is for describing an exemplary inter-record link management method and exemplary link information.

FIG. 2B is for describing an exemplary inter-record link management method and exemplary link information. In the example depicted in FIG. 2B, a record includes link information and actual record data. Link information includes the number of the page containing the linked record, positional information of the linked record on the page, and a provisional record mark. In the present embodiment, a provisional record mark is a type of mark that can only be referenced during the extraction process in snapshot acquisition. That is, with normal access (access other than during snapshot acquisition), this provisional mark cannot be referenced (records are disregarded). Exemplary processing using this provisional record mark will be discussed later.

Exemplary Operation

Figure 3:
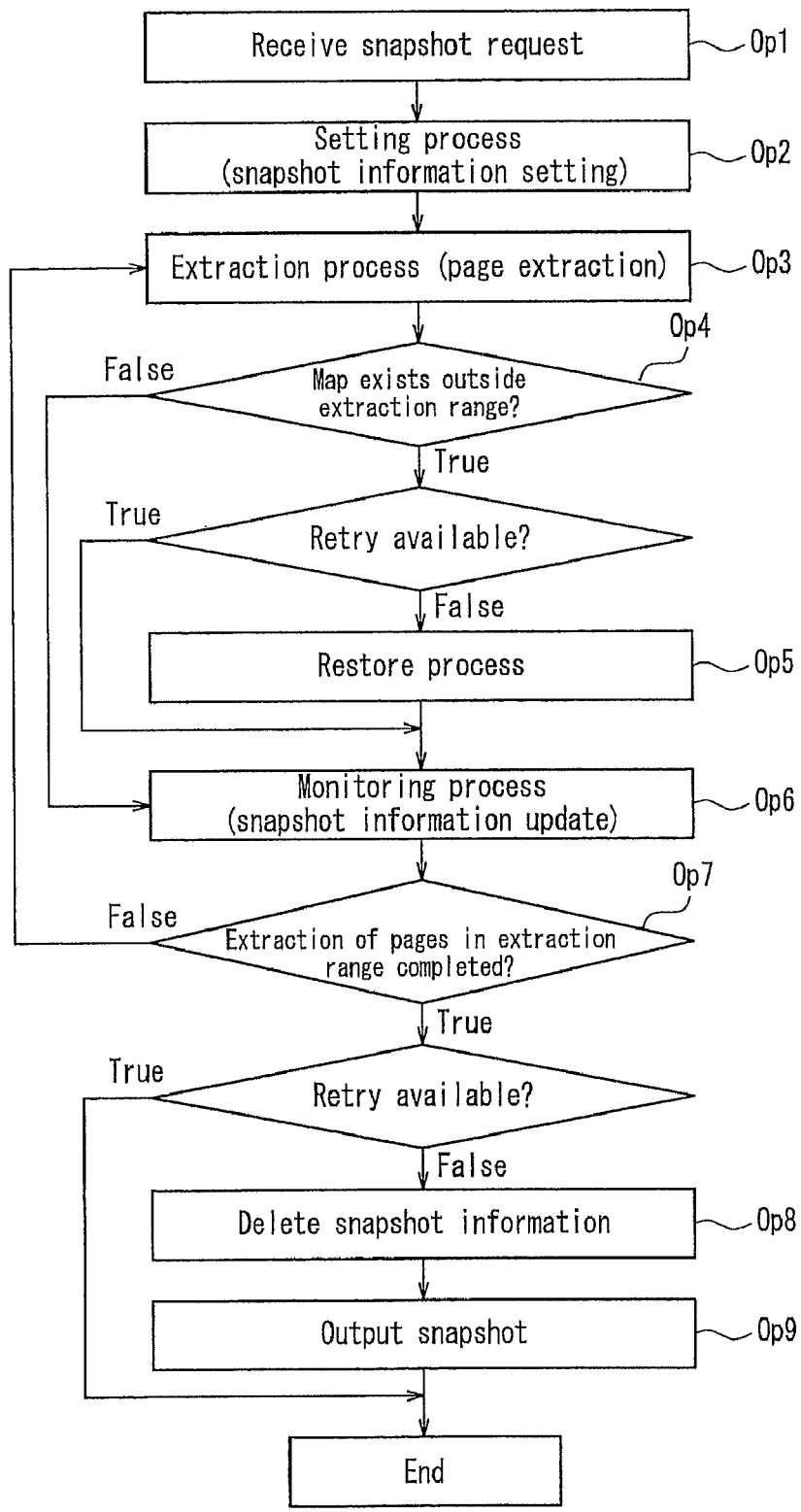
FIG. 3 is a flowchart depicting an exemplary operation when a database management apparatus has received a snapshot request.
Figure 4:
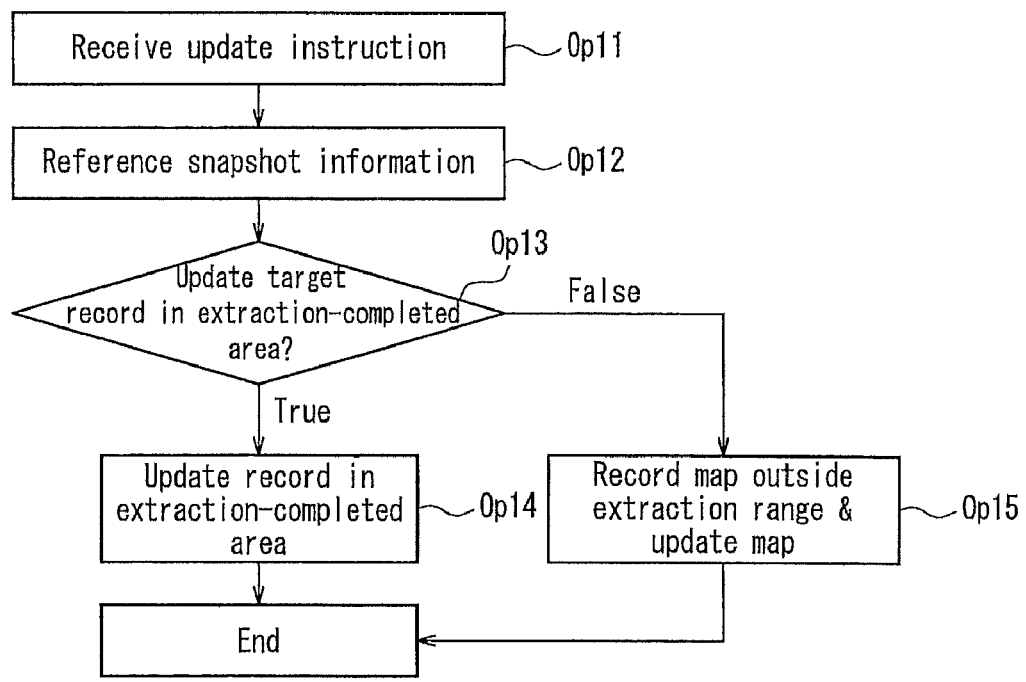
FIG. 4 is a flowchart depicting an exemplary operation in the case where the database management apparatus has received an update instruction.

FIG. 3 is a flowchart depicting an exemplary operation of the database management apparatus 3 when a snapshot request is received. FIG. 4 is a flowchart depicting an exemplary operation of the database management apparatus 3 when an update instruction is received from the application unit 11.

In the example depicted in FIG. 3, when the database management apparatus 3 has received a snapshot request from the snapshot acquisition unit 2 (Op1), the setting unit 4 sets snapshot information in the memory 7a (Op2). Snapshot information includes, for example, information indicating the point in time of the snapshot to be acquired, and information indicating the range of data to be acquired, that is, the extraction range. "Start Page 1" and "End Page 4" in the memory 7 depicted in FIG. 1 is an example of information indicating the extraction range, and indicates that page 1 to page 4 define the extraction range. Note that, in the present embodiment, the extraction range is the range of pages storing data targeted for the snapshot at the point in time at which the snapshot is requested.

The extraction unit 5 sequentially extracts records inside the extraction range, and records the extracted records to the other area (Op3). As an example, the extraction unit 5 is able to read records from the start page 1 of the extraction range to the read buffer 7b one page at a time, extract an image of each record included in the page, and record the extracted image to another area. When one page of record images has been extracted, it is judged whether a map of that page exists outside the extraction range (Op4). If a map exists (true at Op4), the restore unit 9 restores the map that exists outside the extraction range to inside the extraction range (Op5). That is, the update target record inside the extraction range is updated to be the same as the updated map outside extraction range.

Note that the processing can also be performed such that the restore process of Op5 is not executed if retry is available. Retry involves performing extraction again after back dating to the updated data, in the case where data that has undergone snapshot extraction is updated in a preceding transaction started before the snapshot extraction process. The availability of retry can be judged, for example, by whether the retry operation is enabled and by the existence of a preceding transaction.

For example, in the example depicted in FIG. 1, a record C and a record D on page 2 are linked to maps (record C', record D') on page 6 outside the extraction range. Thus, the restore unit 9 updates the record C and the record D on page 2 to the record C' and the record D', after the extraction unit 5 has completed extraction on page 2.

When one page of processing (Op3 to Op5) is over, the monitoring unit 6 records information indicating the extraction-completed area with respect to which record extraction in the extraction range has been completed and the extraction-remaining area with respect to which record extraction has yet to be performed to the memory 7a (Op6). For example, "Extraction-completed page 2" in the memory 7a is an example of information indicating the extraction-completed area and the extraction-remaining area, and indicates that pages 1 and 2 have been extracted and pages 3 and 4 have yet to be extracted (page 3 is currently undergoing extraction). For example, once the processing of Op3 to Op5 is over for page 3, the monitoring unit 6 updates "Extraction-completed page 2" in the memory 7a to "Extraction-completed page 3."

The above processing of Op3 to Op6 is repeated for the extraction range (until Op7 is true). Once all of the pages in the extraction range have undergone extraction, the database management apparatus 3 deletes the snapshot information in the memory 7a (Op8), and outputs the records of the extracted pages as a snapshot (Op9). Note that in the case where retry is available, the database management apparatus 3 may operate such that the processing of Op8 and Op9 is omitted. While retry is available (e.g., while the retry process is enabled and a preceding transaction is being executed), the processing of Op8 and Op9 can thereby be deferred.

Note that the processing depicted in FIG. 3 is intended as an example, and the operation of the database management apparatus 3 is not limited thereto. For example, the restore process (Op5) may be executed after data extraction for the entire extraction range is completed.

Next, in the example depicted in FIG. 4, the database management apparatus 3 receives a database update instruction from the application unit 11 (Op11). Here, the case where the update unit 8 receives an update instruction for a record inside the extraction range by a subsequent transaction started after the point in time at which snapshot acquisition was designated will be described as an example. The update unit 8 references the snapshot information in the memory 7a (Op12), and judges whether the record targeted by the update instruction is in the extraction-completed area or in the extraction-remaining area (Op13). If the update target record is in the extraction-completed area (true at Op13), the update unit 8 updates the update target record in the extraction-completed area. If the update target record is in the extraction-remaining area (false at Op13), the update unit 8 records a map of the update target record in the extraction-remaining area to an area outside the extraction range, and updates the map.

For example, in the example depicted in FIG. 1, because pages 1 and 2 have undergone extraction, the update unit 8, in the case of the update target record being on page 1 (i.e., APL1), directly updates the record on page 1. In the case of the update target record being on page 4, that is, an extraction-remaining page (i.e., APL3), the update unit 8 records a map of the record G on page 4 to page 7 outside the extraction range, and updates the map to a record G'. For example, the update unit 8 is able to copy the update target record (hereinafter, referred to as an original record) to a page outside the extraction range, and set link information for this copied record (hereinafter, referred to as a linked record) to the original record. Further, a provisional record mark that is only enabled during the extraction process is set in the image of the original record. The image of the original record is thereby restored to the image of the linked record by the restore unit 9, after the extraction unit 5 has extracted the original record.

In FIG. 1, since the extraction-completed pages (pages 1, 2) have already undergone the extraction process, record update by a subsequent transaction on these extraction-completed pages does not in any way affect transaction consistency with respect to the database snapshot content. Thus, the update unit 8 is able to update records on extraction-completed pages.

On the other hand, an extraction-in-progress page (page 3 in the example in FIG. 1) is a page that is currently undergoing record extraction. Also, an extraction-remaining page (page 4) is a page that has yet to undergo the extraction process. Updating these pages affects the transaction consistency of the extraction process in snapshot acquisition. Thus, the update unit 8 updates these pages after recording maps thereof to an area outside the extraction range.

In FIG. 1, page 7 is a restore-in-progress map page, and on this page is recorded a record resulting from a page inside the extraction range that has yet to be extracted being updated once by the update unit 8. After the extraction process on the page inside the extraction range that has yet to be extracted (original page 4) is completed, the restore-in-progress map page (linked page 7) is restored to the original page 4. Data consistency can thus be ensured by reflecting the update content of the linked page in the original page after extraction is completed.

Specific Example of Restore Process

Figure 5A:
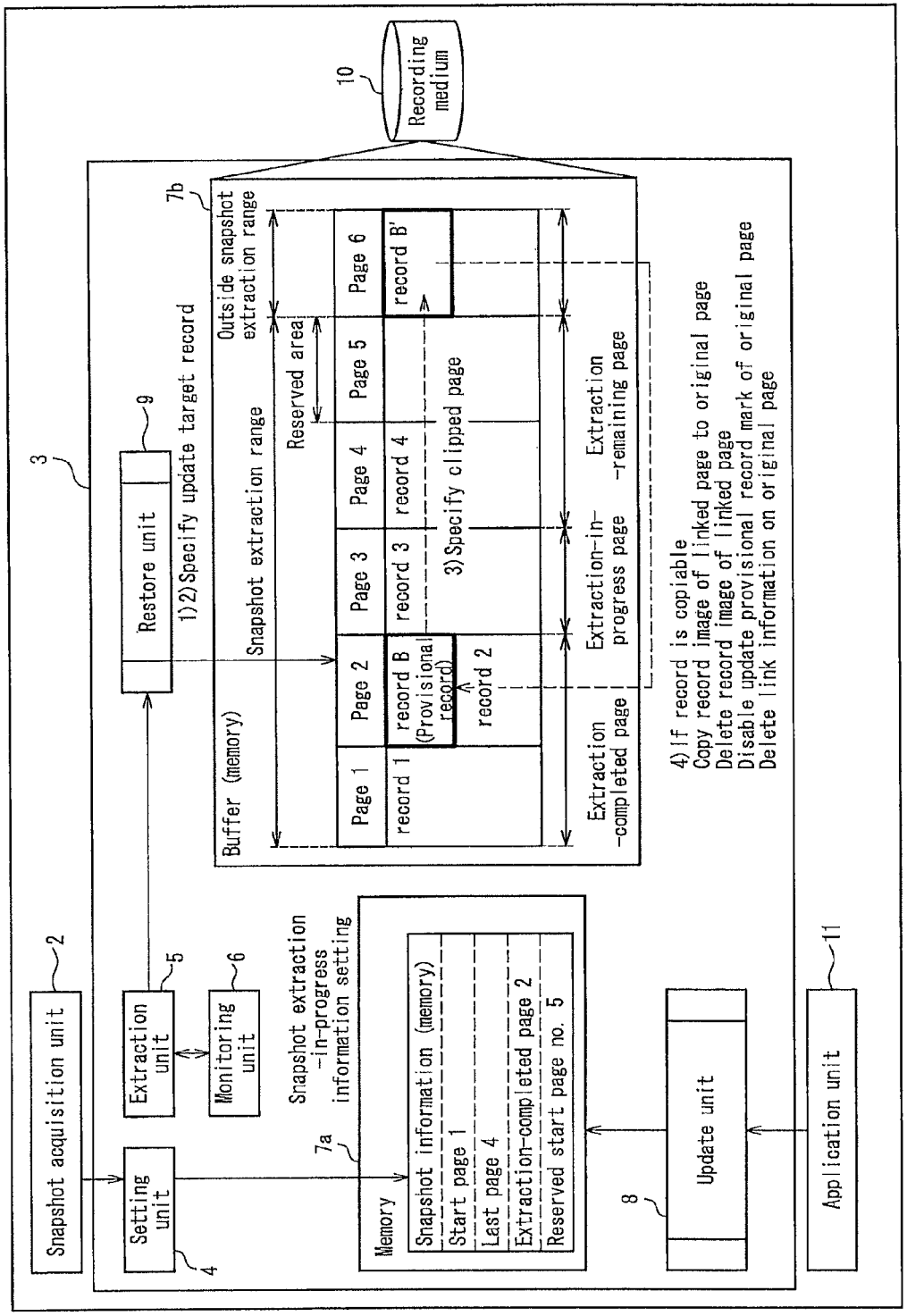
FIG. 5A is for describing a specific example of a restore process.
Figure 5B:
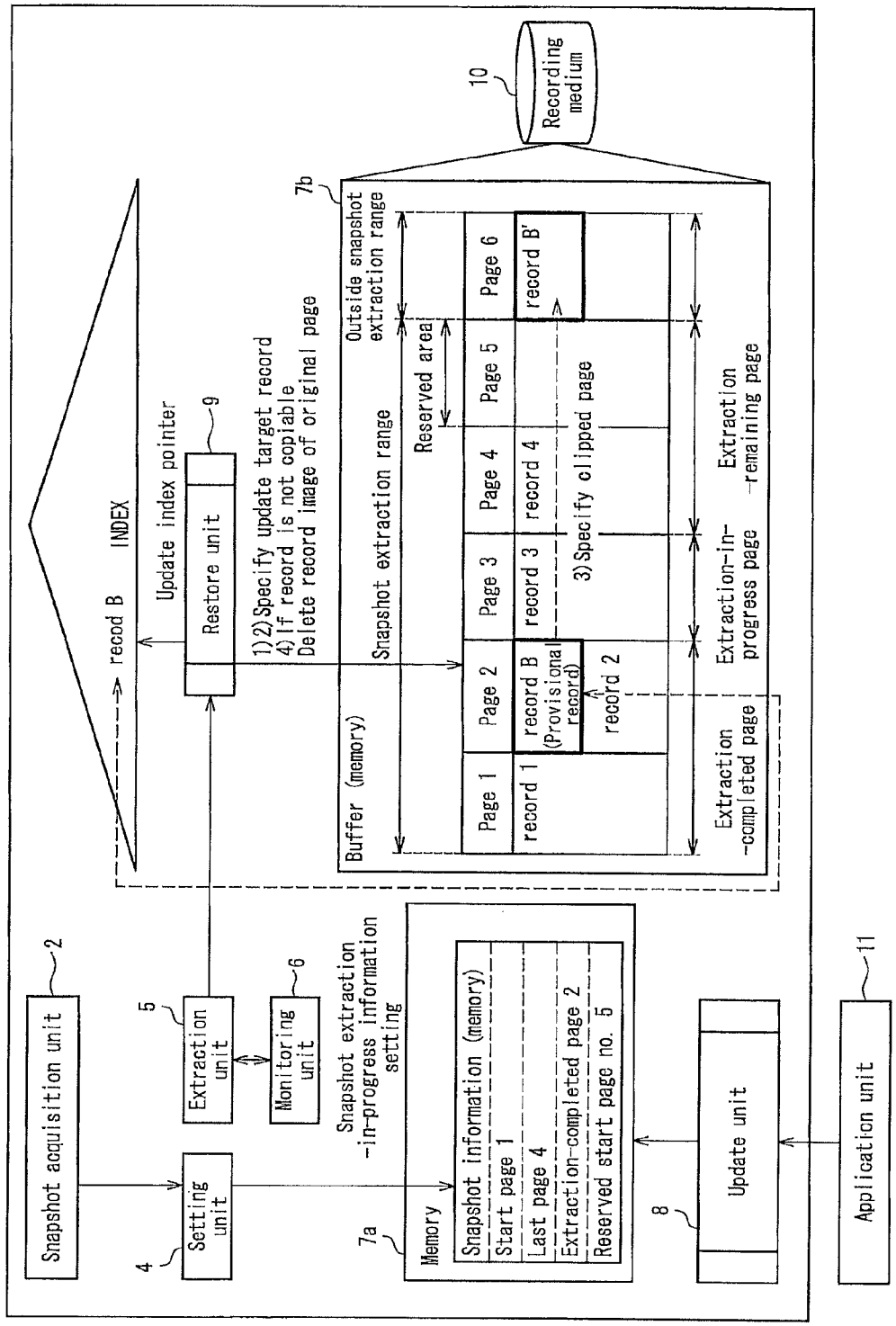
FIG. 5B is for describing a specific example of a restore process.

FIGS. 5A and 5B are for describing specific examples of the restore process (Op5). FIG. 5A represents the restore process in the case where a record can be copied from the linked page to the original page, and FIG. 5B represents the restore process in the case where a record cannot be copied from the linked page to the original page.

As described above, execution of the restore process can, for example, be triggered by completion of the extraction process on the original page (e.g., page 2 in FIG. 1) by the extraction unit 5. The restore process can be executed as a transaction of the database management apparatus 3 (in a DBMS), by the extraction unit 5 and the restore unit 9.

Also, in order to prevent response degradation due to exclusion of the restore process with respect to further updates, the restore process preferably is executed with exclusion in record units. Alternatively, the restore process preferably is executed with exclusion in record units, and transactions preferably are divided and executed at appropriate intervals (e.g., every n records).

Hereinafter, a specific example of the restore process by the restore unit 9 will be described with reference to FIGS. 5A and 5B.

1) A record (record B) targeted for updating is specified on a page that has undergone processing (original page; page 2 in FIGS. 5A and 5B). For example, a record whose provisional record mark is enabled can be specified as a record targeted for updating.

2) A newly clipped page (hereinafter, linked page) is specified from the link information of the specified page (page 6 is specified in the examples depicted in FIGS. 5A and 5B).

3) An attempt is made to copy the target record image from the linked page to the original page.

3-A) If copiable, the record image of the record on the linked page is copied to the original page (i.e., FIG. 5A). Specifically, the record image on the linked page is deleted, allowing the area of the linked page to be reused, and the provisional record mark on the original page is disabled. This allows the original page to also be recognized in processing other than the extraction process. Also, the link information of the original page is deleted.

3-B) If not copiable (e.g., the record image on the linked page has increased in size), the record image is not copied (i.e., FIG. 5B). In this case, the record image on the original page is deleted, freeing up the area of the original page, and, if an index has been set, the index pointer is updated. In the case where all records on the original page and the linked page have been deleted, these pages can thereby be wholly reused as new pages.

The restore unit 9 implements the processing of the above 1) to 3) on all records on the original page. In the present embodiment, a situation can arise where a record exists on a linked page that has been newly clipped to an area outside the extraction range as a result of the update process by the update unit 8 (e.g., UPDATE command). That is, a state can occur where a record image is managed in duplicate on this linked page and the original page. When a record image is thus managed in duplicate, the disk capacity managed as a database is constricted. Thus, the disk capacity can be effectively used by reverting to a state in which a single record image is managed. That is, releasing the area in which a map outside the extraction range is recorded after the update target record inside the extraction range has been updated to be the same as the map is preferable from the viewpoint of efficient resource usage.

Second Embodiment

Figure 6:
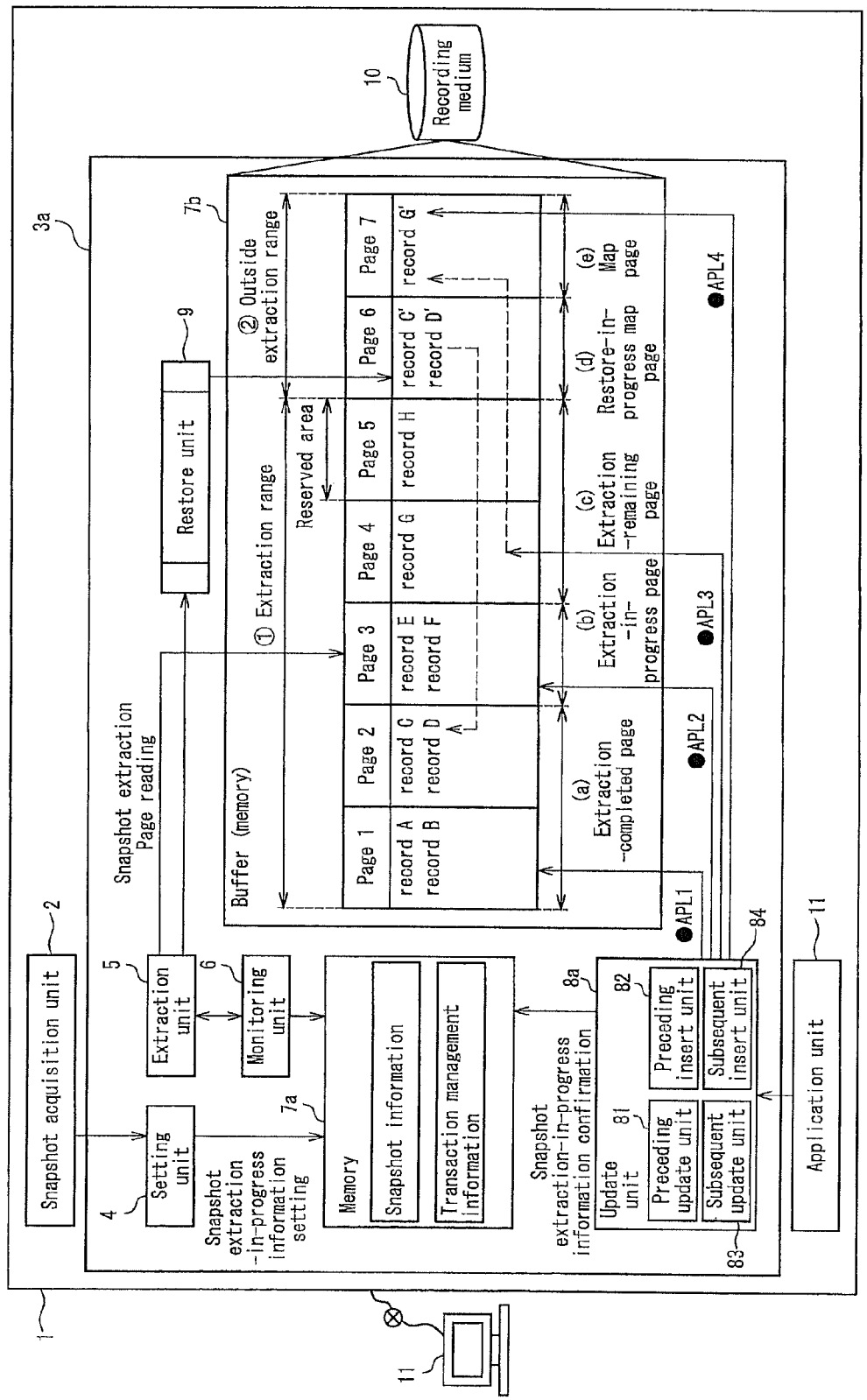
FIG. 6 depicts an exemplary configuration of a database server according to a second embodiment.

FIG. 6 depicts an exemplary configuration of a database server according to a second embodiment. In FIG. 6 the same numerals are given to the same parts as FIG. 1. A database management apparatus 3a according to the present embodiment is provided with a mechanism for ensuring data consistency not only in the case where updating of a database by a subsequent transaction is executed during snapshot acquisition but also in the case where snapshot acquisition is started during updating by a preceding transaction. Thus, in the database management apparatus 3a, an update unit 8a includes a preceding update unit 81, a preceding insert unit 82, a subsequent update unit 83 and a subsequent insert unit 84.

In the present embodiment, a preceding transaction is a transaction to be executed before the point in time at which a snapshot is acquired. The acquired snapshot (extracted record) ought to reflect the update content resulting from the preceding transaction. On the other hand, a subsequent transaction is a transaction to be executed after the point in time at which a snapshot is acquired, and the acquired snapshot ought to be data of a state prior to the update by the subsequent transaction. Note that a preceding transaction may also be called a transaction-in-progress or an in-progress transaction. Also, a subsequent transaction may be referred to as a new transaction.

For example, by recording information indicating the state of snapshot acquisition and information indicating the state of the active transaction to the memory 7a, it can be judged whether a separate transaction precedes or is subsequent to a given snapshot acquisition process. A specific example of this judgment will be discussed later.

Exemplary Update by a Preceding Transaction

In the case where an instruction to update a record inside the extraction range by a preceding transaction is received during snapshot acquisition (e.g., during extraction by the extraction unit 5), the preceding update unit 81 judges whether the record targeted by the update instruction is in the extraction-completed area or in the extraction-remaining area with reference to the memory 7a.

If the update target record of the preceding transaction is in the extraction-remaining area, the preceding update unit 81 updates the update target record of this extraction-remaining area. In the case of a record in the extraction-remaining area, data consistency in the snapshot acquisition process is maintained even if the preceding update unit 81 updates the record.

If the update target record of the preceding transaction is in the extraction-completed area, the preceding update unit 8 is able, for example, to execute the processing of either (1) or (2) described below.

(1) Extraction Retry

If the update target record is in the extraction-completed area, the preceding update unit 81 is able to update the update target record, and further record information indicating the area containing the updated record to the memory 7a as retry area information. The preceding update unit 81 is thereby able to notify the extraction unit 5 that an extracted record has been updated. If retry area information has been recorded to the memory 7a by the preceding update unit 81, the extraction unit 5 again extracts the record from the area indicated by the retry area information and records the extracted record to the other area. Data consistency in the snapshot acquisition process is thereby ensured.

Figure 7:
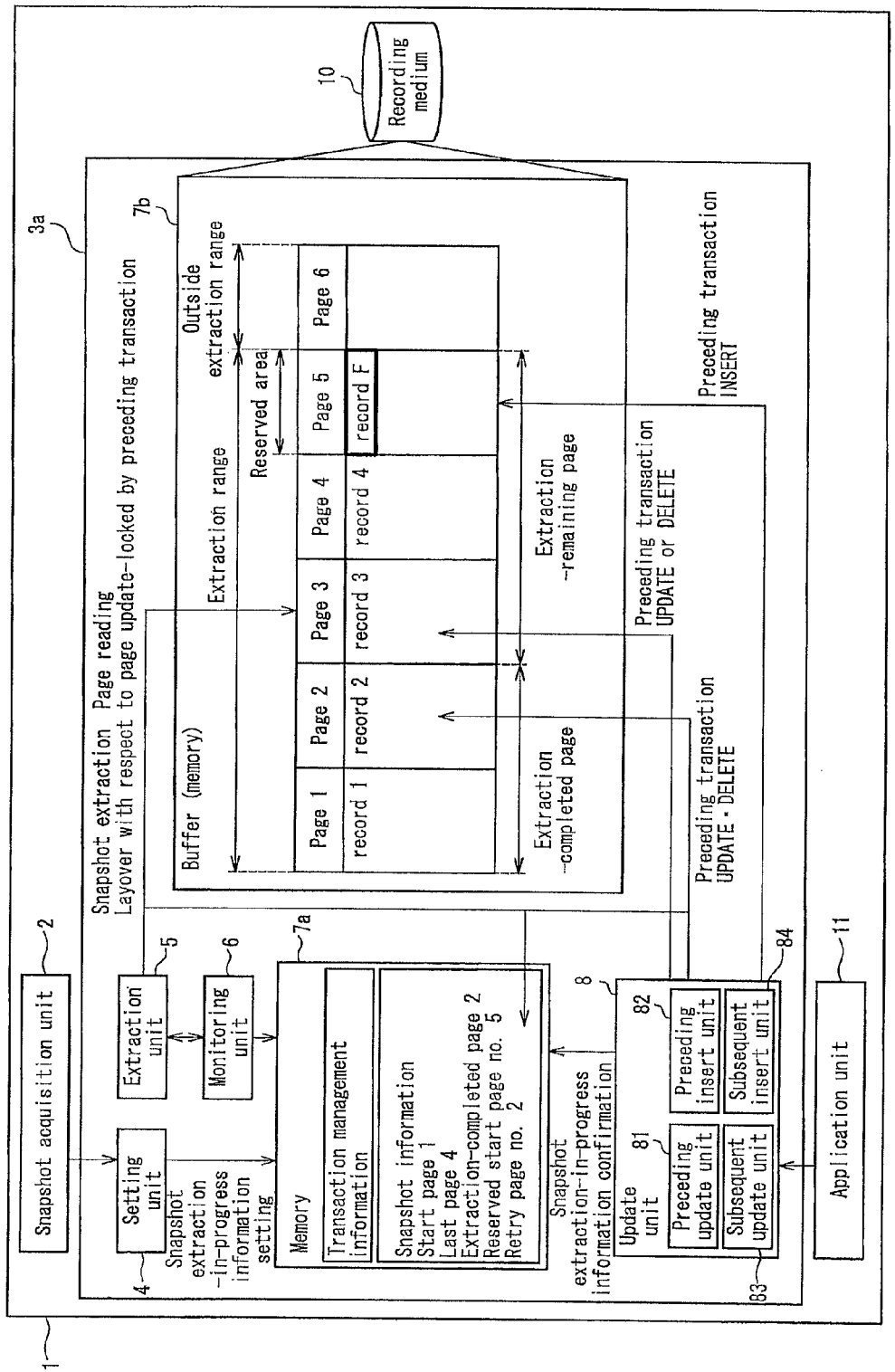
FIG. 7 is for describing an exemplary extraction retry operation.

FIG. 7 is for describing an exemplary extraction retry operation. In the example depicted in FIG. 7, pages 1 and 2 are pages that have undergone extraction by the extraction unit 5, and pages 3 and 4 are pages that have yet to undergo extraction. The preceding update unit 81, in the case of executing UPDATE or DELETE on page 2 as a result of a preceding transaction, records "Retry page no. 2" in the snapshot information of the memory 7a. The extraction unit 5 again extracts the record on page 2 on detecting that "Retry page no. 2" has been recording in the snapshot information, after having extracted the record on page 2. The extraction unit 5 is thereby able to restart the extraction process from a point at which there was no conflict in the extraction result (here, page 2), for example.

Note that in the example depicted in FIG. 7, the preceding insert unit 82 inserts a record into page 5, which is a reserved area, in the case of executing INSERT as a result of a preceding transaction. Information on the reserved area is recorded, for example, as "Reserved start page no. 5" in the snapshot information. The extraction process in snapshot acquisition can thus be continued even if the INSERT process arises as a result of a preceding transaction.

The above extraction retry process is particularly effective in cases such as where the update process is prioritized, or where the transactions mainly involve the INSERT process, or where snapshot acquisition can be extended.

(2) Preceding Transaction Cancel

The preceding update unit 81 is also able to cancel the update process of a preceding transaction, in the case where the record targeted for update by the preceding transaction is in the extraction-completed area. For example, in the case where UPDATE or DELETE on a record on an extraction-completed page is requested, the preceding update unit 81 is able to cancel its own processing due to a deadlock.

Figure 8:
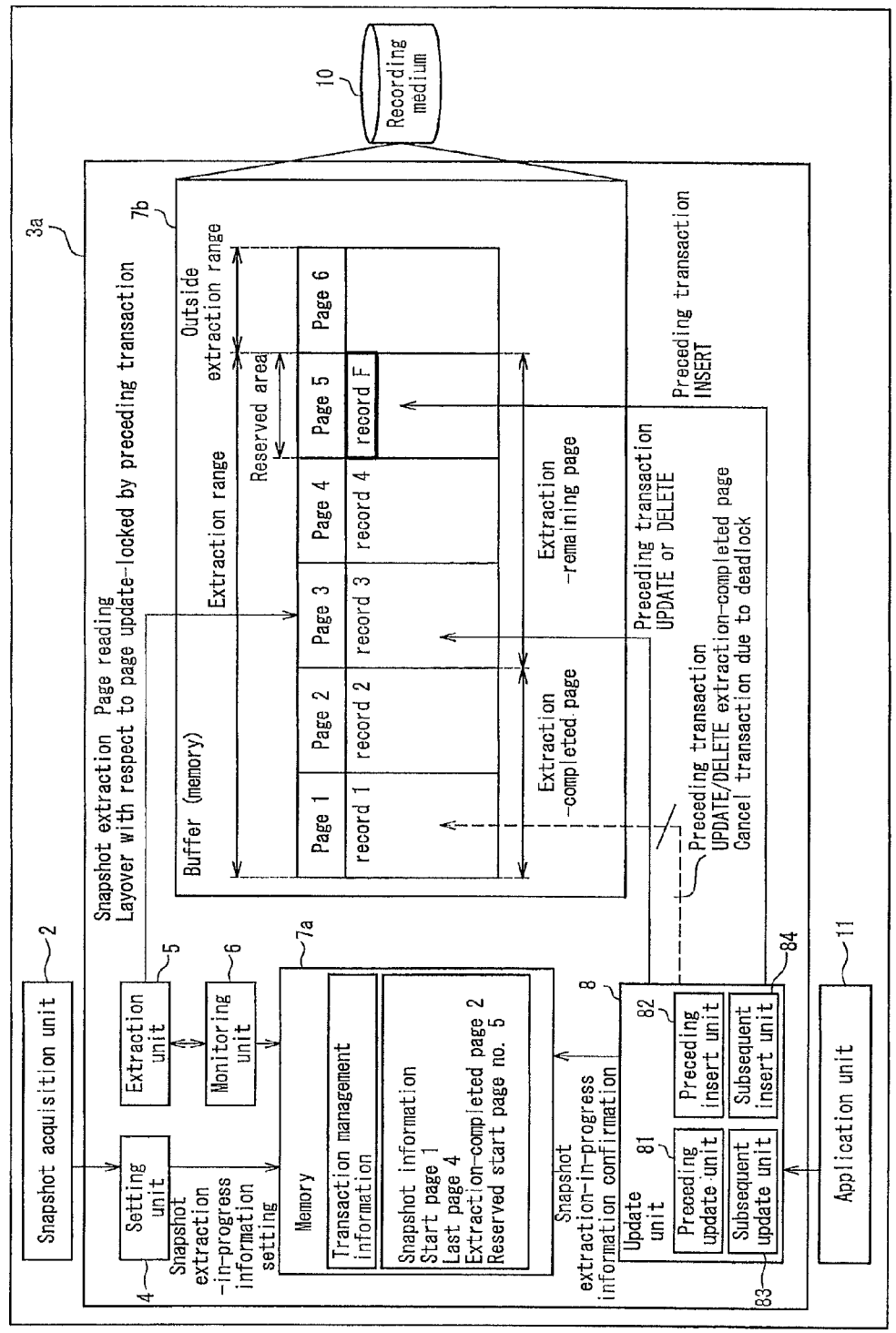
FIG. 8 is for describing an exemplary preceding transaction cancel operation.

FIG. 8 is for describing an exemplary preceding transaction cancel operation. In the example depicted in FIG. 8, pages 1 and 2 are extraction-completed pages, and pages 3 and 4 are extraction-remaining pages. In the case of the preceding update unit 81 executing UPDATE or DELETE on page 2 as a result of a preceding transaction, the transaction is cancelled due to a deadlock. Note that even in the example depicted in FIG. 8, the preceding insert unit 82, in the case of executing INSERT as a result of a preceding transaction, inserts the record into page 5, which is a reserved area. That is, the transaction can be continued in the case of the INSERT process.

The above proceeding transaction cancel is particularly effective in cases such as where the snapshot acquisition process is prioritized, or where the transactions mainly involve the INSERT process, or where an active proceeding transaction can be cancelled.

(3) Extraction Process Layover

In the case where updating of a record inside the extraction range by a preceding transaction is already being performed at the point in time of snapshot acquisition, the extraction unit 5 is able to execute the extraction process after waiting for the preceding transaction to end. That is, the extraction process can be laid over until the end of the preceding transaction on the snapshot extraction range. UPDATE and DELETE on records in the extraction range by a subsequent transaction during this layover preferably are executed after waiting for the extraction process. Note that the INSERT process of a subsequent transaction need not wait for the extraction process in the case of inserting a record into an area outside the extraction range.

By thus starting the extraction process after waiting for the preceding transaction to end, a snapshot of the state after completion of the preceding transaction can be reliably obtained. That is, an image that is consistent with the preceding transaction can be acquired. This method of executing the extraction process after waiting for the preceding transaction to end is effective, for example, in cases such as where a reliable snapshot acquisition process is prioritized or where the tasks mainly involve the INSERT process.

(4) INSERT by a Preceding Transaction

The preceding insert unit 82, in the case of receiving an instruction to insert (newly add) a record by a preceding transaction, is able to record a record targeted by the insert instruction to a reserved area inside the extraction range. By managing an area for storing data resulting from an insert operation, buffering of the snapshot acquisition process in relation to the insert operation can be eliminated. The insert process of a preceding transaction is executed without affecting the data consistency of the snapshot acquisition process. As a result, processing for ensuring data consistency, computer resources and the amount of user operations can be further decreased.

Note that this insert process to a reserved area resulting from a preceding transaction can also be similarly executed in the case of any of the above (1) to (3).

(5) Extraction Process Layover due to Record Update by a Preceding Transaction

In the case where the update target record is in an extraction-remaining area, the preceding update unit 81 is able to update the update target record inside the extraction range, after having prohibited extraction of the update target record by the extraction unit 5. For example, in the case where the extraction unit 5 references a record inside the extraction range, it is possible that update of that record by a preceding transaction is currently being executed. In this case, the extraction unit 5 preferably waits until update of the record by the preceding transaction is completed.

The extraction unit 5 is thereby able to extract an image of the record after completion of the update by the preceding transaction as a snapshot. As a result, ensuring data consistency is further facilitated. Also, the preceding transaction can be prioritized, and the performance of the update process can be ensured. Further, the volume of rollback logs can be suppressed. For example, the above update process of the preceding transaction and the extraction process can be implemented without buffering, enabling logs to be discarded.

The above layover of the extraction process is effective in cases such as the following. For example, in the case of the extraction unit 5 referencing the records on page 3, such as APL2 depicted in FIG. 6, there is a possibility that the records on page 3 are currently being update by a preceding transaction. In this case, preferably the update process by the preceding transaction is executed after having prohibited record extraction of page 3 by the extraction unit 5. Also, the processing of (5) is particularly effective in a situation where the snapshot process is not laid over until the end of a preceding transaction that arose before the point in time of the snapshot instruction (e.g., in the case of the above extraction retry process of (1) or preceding transaction cancel process of (2)). For example, when page 3 has been update-locked by a preceding transaction at the point in time at which the extraction unit 5 finishes the extraction process on pages 1 and 2, as depicted in FIG. 7, the extraction unit 5 waits to reference page 3.

Exemplary Update by a Subsequent Transaction

The update process by the subsequent transaction can be executed similarly to the first embodiment. Hereinafter, a detailed example of the update process by a subsequent transaction will be described.

In the case where a subsequent transaction involves updating a record in the extraction-completed area (here, an UPDATE or DELETE operation is given as an example), the subsequent update unit 83 updates or deletes this record, similarly to the update unit 8 in the first embodiment. In this case there is no buffering from the extraction process of the extraction unit 5. If the record has increased in length as a result of the update operation and cannot be stored on the same page, the subsequent update unit 83 is able to store the update result on a page outside the extraction range (e.g., page 6 in FIG. 6).

Even in the case where the subsequent transaction involves updating a record in the extraction-remaining area (here, an UPDATE or DELETE operation is given as an example), the subsequent update unit 83 copies the update target record (hereinafter, original record) to a page outside the extraction range, similarly to the first embodiment. At this time, link information for the copied record (hereinafter, linked record) is set to the original record. Further, a provisional record mark that is only enabled during the exaction process is set in the image of the original record. For example, in the case of the update type being UPDATE, the subsequent update unit 83 updates the record image of the linked record. For example, in the example depicted in FIG. 6, in the case of the subsequent update unit 83 updating the record G on the extraction-remaining page 4, a pointer is set such that the link information of the record G on page 4 points to the map record G' on page 7. The subsequent update unit 83 enables the provisional record mark of the record G on page 4, and updates the record G on page 4 to the record G'.

If the update type is DELETE, the subsequent update unit 83 deletes the linked record. If an index has been set, the subsequent update unit 83 nullifies the index information.

If a record insert instruction is received from a subsequent transaction, the subsequent insert unit 84 preferably records the record targeted by the insert instruction to an area outside the extraction range. For example, in the case where update type is an insert instruction (INSERT command), the subsequent insert unit 84 inserts the record into an area outside the extraction range.

By thus specially managing an area for storing data to be inserted as a result of an insert operation, buffering of the snapshot acquisition process in relation to the insert operation can be eliminated. Here, because a record of a subsequent transaction is inserted into an area outside the extraction range, buffering between the extraction process at the time of snapshot acquisition and the insert process by the subsequent transaction can be eliminated. Note that information indicating the area outside the extraction range for storing insertion data resulting from the subsequent transaction preferably is recorded in advance in snapshot information or the like.

Exemplary Operation

Hereinafter, a detailed exemplary operation by the database management apparatus 3a in the present embodiment will be described.

Exemplary Setting. Process

The setting unit 4 records, for example, snapshot information depicted in the following Table 1 to the memory 7a, based on a snapshot request received from the snapshot acquisition unit 2.

TABLE 1

| Snapshot Information |
| --- |
| Target resource (DSI) ID |
| Snapshot acquisition active flag (true/false) |
| Request serial no. |
| Start page no. |
| Last page no. |
| Extraction-completed page no. for preceding transactions |
| Extraction-completed page no. for subsequent transactions |
| Reserved start page no. |
| Reserved last page no. |
| Retry page no. |

Information specifying the target to be extracted as a snapshot is included in the snapshot request. For example, information for identifying a set of related data in the database such as DSI identifiers or table IDs may be included in the snapshot request. In the case where snapshot creation is instructed, the setting unit 4 specifies a data extraction range (e.g., DSI or table) at that timing, and records the extraction range to the memory 7a. The memory 7a preferably is a memory that can be referenced in the update process (SQL application). The behavior of the update process (SQL application) on the data extraction range resulting from another transaction can thereby be controlled.

In the example depicted in Table 1, the setting unit 4 records a target resource ID indicating a group of snapshot acquisition target data and a flag indicting the execution state of snapshot acquisition (e.g., true=extraction in progress; false=extraction ready). The setting unit 4 sets the snapshot acquisition active flag to true, and records the start page number and the last page number. These are an example of information indicating the extraction range. The extraction unit 5 extracts records in order from the start page number.

The monitoring unit 6 updates the extraction-completed page number for preceding transactions and the extraction-completed page number for subsequent transactions, according to the state of processing by the extraction unit 5. These are an example of information indicating the extraction-completed area. Access to data in the extraction range for both a preceding transaction and a subsequent transaction can be controlled, by thus setting information representing the extraction-completed area for both preceding transactions and subsequent transactions. Specifically, in the case of retrying extraction of a given record when transaction inconsistencies occur between a preceding transaction and the extraction process, for example, the database management apparatus 3a can operate such that the extraction-completed page number for subsequent transactions is not updated, in order to prevent updating of the extraction-completed page number for subsequent transactions until the extraction process has been retried.

The monitoring unit 6, in the case where, for example, the snapshot acquisition active flag is true (extraction in progress), records information (example of information indicating the extraction-completed area and the extraction-remaining area) indicating the range for which extraction has been completed (range of pages), and information indicating the last page on which valid data is stored.

The request serial number is a number identifying the snapshot request, and may, for example, be incremented every time a snapshot is requested. This request serial number is used in order to judge whether a transaction precedes the snapshot process (preceding transaction) or is subsequent to the snapshot process (subsequent transaction), by being referenced by a transaction that will be executed in parallel with the snapshot process.

The extraction-completed page number for preceding transactions and the extraction-completed page number for subsequent transactions are used, for example, in order for a transaction that will be executed in parallel with the snapshot extraction process to recognize the state of the snapshot extraction process.

Also, the setting unit 4 records information specifying a reserved area for a preceding transaction to store records (e.g., INSERT data and data resulting from a record increasing in length due to UPDATE) to the memory 7a. The reserved start page number and the reserved last page number in Table 1 are an example of this information. Note that apart from the above, information for determining the area outside the extraction range for storing a map of the update target record at the time of the update process by a subsequent transaction may also be included in the snapshot information, for example. By thus including an area for records resulting from the insert process by a preceding or subsequent transaction and an area for maps generated at the time of the update process by a subsequent transaction, the reserved area can be managed and efficient use of resources enabled.

The retry page number in Table 1 is recorded in order for the extraction unit 5 to re-extract the record, in the case where the update process of a preceding transaction is performed on a record in the extraction-completed area, as described above.

Hereinabove, exemplary setting of snapshot information was described, but snapshot information is not limited to the above example.

Exemplary Preceding/Subsequent Transaction Judgment

In the present embodiment, the setting unit 4 records the point in time for acquiring the snapshot and the request serial number in association with one another to the memory 7a as transaction management information. Information relating to a transaction performed by the database management apparatus 3a is also further recorded as transaction management information. For example, the ID of the active transaction, the start point in time, the execution state and the like are recorded as transaction management information. For example, it can be judged whether the transaction precedes or is subsequent to the snapshot acquisition process, by comparing the start time of the active transaction and the time at which the snapshot is to be acquired. Note that the method of judging whether a transaction is preceding or subsequent is not limited thereto. For example, judgment is possible even if the request serial number of the snapshot is recorded in association with the transaction ID.

Update Process

Figure 9:
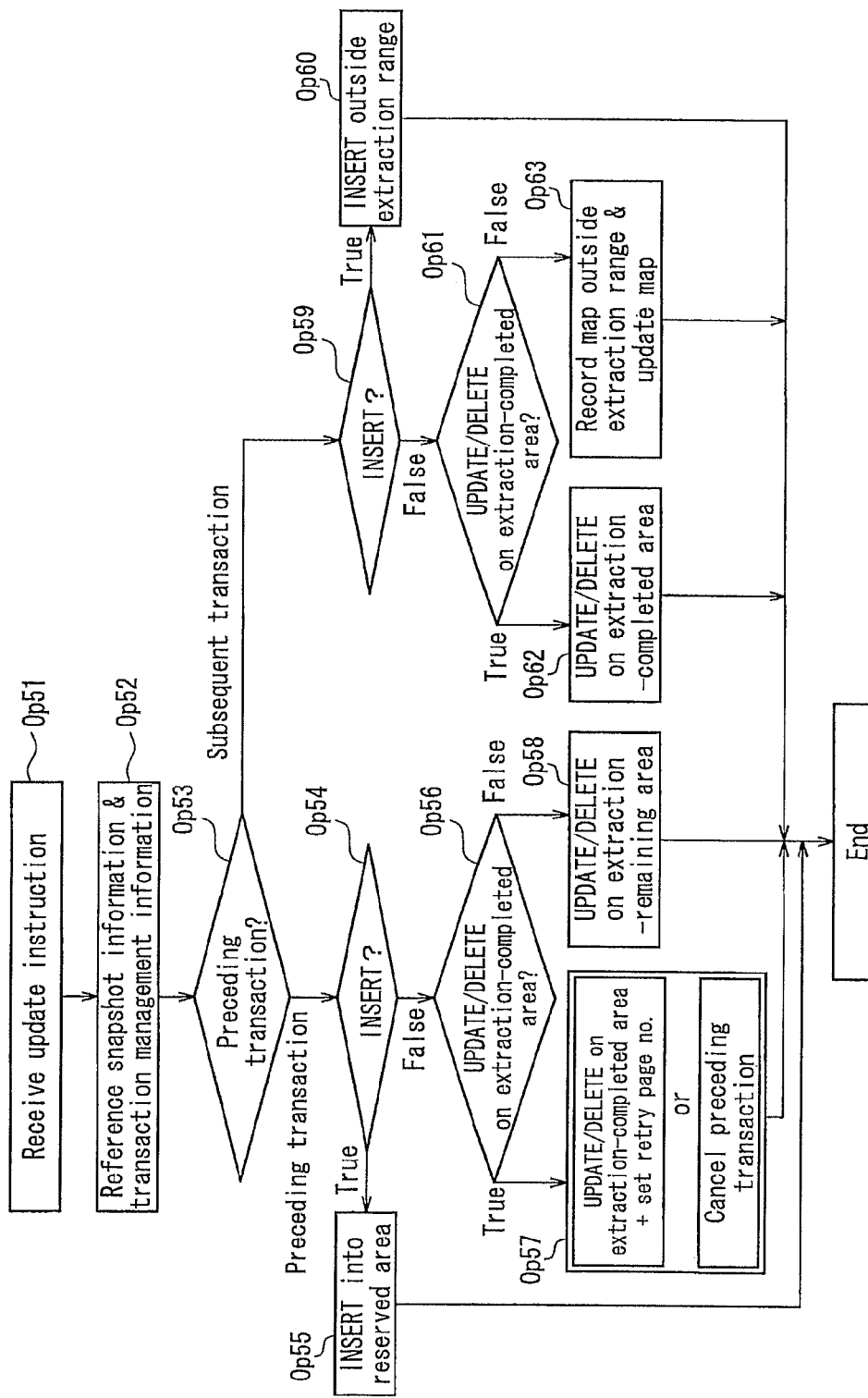
FIG. 9 is a flowchart depicting an exemplary operation by an update unit 8a that has received an update instruction.

FIG. 9 is a flowchart depicting an exemplary operation by the update unit 8a, having received an update instruction from the application unit 11. In the example depicted in FIG. 9, the update unit 8a, on receiving an update instruction (Op51), references the snapshot information in the memory 7a and the transaction management information (Op52). Here, as an example, information on the content depicted in Table 1 is recorded in the memory 7a as snapshot information. An identifier (ID) of the transaction requested of the database management apparatus 3a and the start time and state of the transaction, for example, are recorded in the transaction management information. The state of the transaction includes, for example, ready, active and done. The transaction management information can, for example, be updated by the update unit 8a according to the processing of the transaction, after the database management apparatus 3a has stored the transaction request in the memory 7a at the time of receiving the transaction request.

The update unit 8a judges whether the received update instruction is an update instruction of a preceding transaction or an update instruction of a subsequent transaction, based on the snapshot information and the transaction management information (Op53).

In the case where the update instruction is in a preceding transaction, the update unit 8a judges whether the update instruction is INSERT (Op54). If the update instruction is INSERT (true at Op54), the preceding insert unit 82 inserts a record into the reserved area in the extraction range. The preceding insert unit 82 is, for example, able to find out the position of the reserved area in the recording medium 10, with reference to the reserved start page number and the reserved last page number included in the snapshot information of Table 1.

If the update instruction of the preceding transaction is not INSERT (false at Op54), the update unit 8a judges whether the update instruction is UPDATE or DELETE on the extraction-completed area (Op56).

If the update instruction is UPDATE or DELETE on the extraction-completed area (true at Op56), the preceding update unit 81 executes one of the extraction retry process or the transaction cancel process (Op57). The extraction retry process, as described above, involves updating or deleting a record in the extraction-completed area, and recording the number of the page containing the record to the memory 7a as the retry page number. The transaction cancel process involves cancelling the preceding transaction relating to the update instruction. Which processing to execute can be selected depending on the system application. If the update instruction is UPDATE or DELETE on the extraction-remaining area (false at Op56), the preceding update unit 81 executes UPDATE or DELETE on the extraction-remaining area.

If it is judged at Op53 that the update instruction is in a subsequent transaction, the update unit 8a judges whether the update instruction is INSERT (Op59). If the update instruction is INSERT (true at Op59), the preceding insert unit 82 inserts the record in a reserved area outside the extraction range. The position of the reserved area may be recorded in the memory 7a in advance as snapshot information. The preceding insert unit 82 is thereby able to find out the position of the reserved area in the recording medium 10.

If the update instruction of the subsequent transaction is not INSERT (false at Op59), the update unit 8a judges whether the update instruction is UPDATE or DELETE on the extraction-completed area (Op61). If true at Op61, the subsequent update unit 83 executes UPDATE or DELETE on the extraction-completed area (Op62), and if false, the subsequent update unit 83 records a map in the reserved area outside the extraction range, and executes UPDATE or DELETE on the map (Op63). Note that Op61 to Op63 can be executed similarly to Op13 to Op15 depicted in FIG. 4.

The operation of the update unit 8a is not limited to the above examples. For example, in Op53, in addition to judging whether the transaction is a preceding transaction or a subsequent transaction, it can be judged whether the update process of the subsequent transaction needs to be inhibited, that is, whether to delay the update process of the subsequent transaction. This enables control for maintaining consistency between a subsequent transaction and a preceding transaction.

Snapshot Acquisition Process

Figure 10:
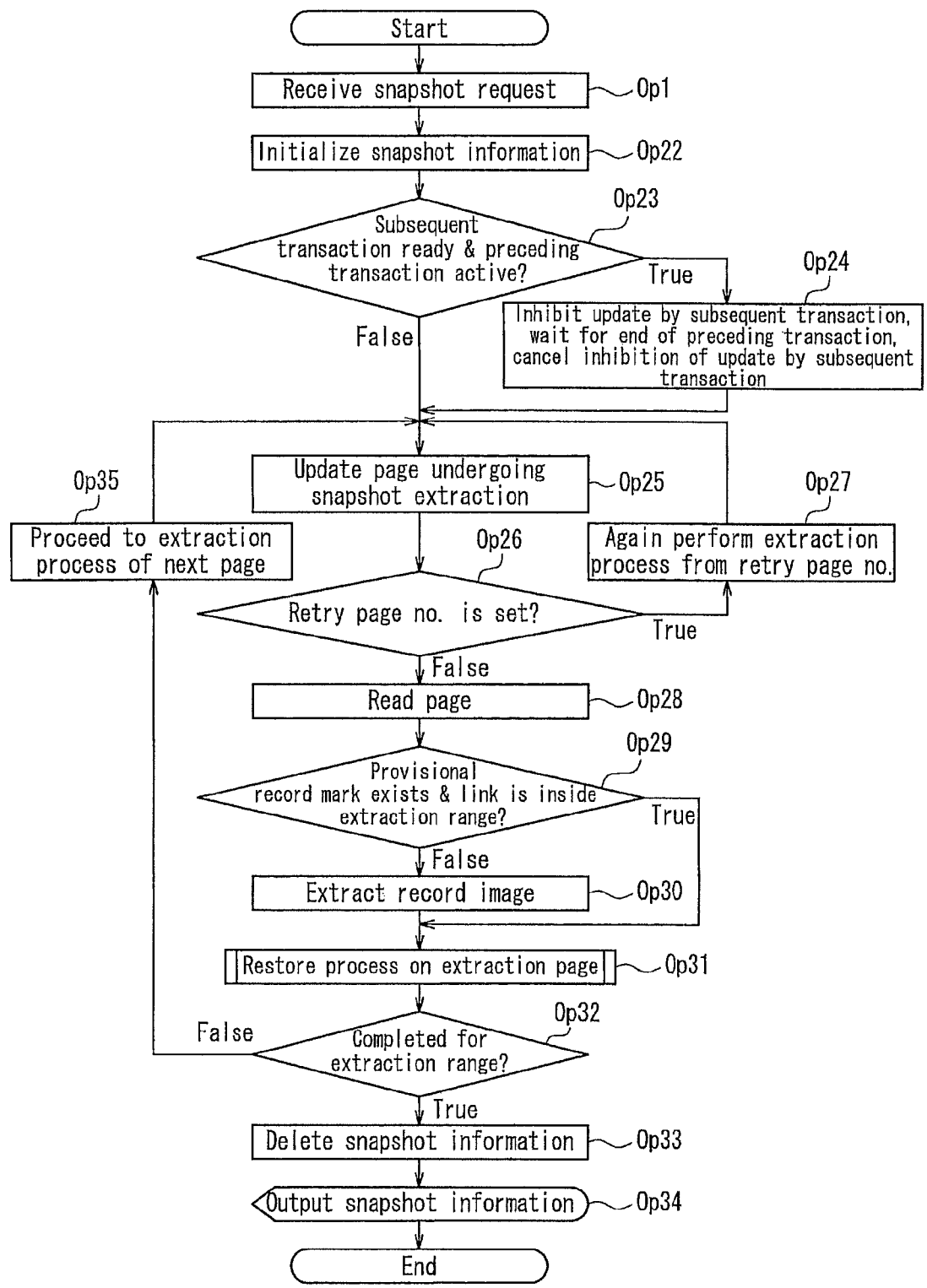
FIG. 10 is a flowchart depicting an exemplary operation when a database management apparatus 3 acquires a snapshot.

FIG. 10 is a flowchart depicting an exemplary operation when the database management apparatus 3a acquires a snapshot. In the example depicted in FIG. 10, when the database management apparatus 3a has received a snapshot request (Op1), the setting unit 4 initializes the snapshot information in the memory 7a (Op22). Here, the case where information having the content depicted in the above Table 1 is recorded in the memory 7a as snapshot information will be described as an example. In Op22, the setting unit 4 records the target resource ID included in the snapshot request to the memory 7a, and updates the snapshot acquisition active flag to true. Also, the setting unit 4 generates a request serial number and records the generated request serial number to the memory 7a.

TABLE 1

Snapshot Information

Target resource (DSI) ID
Snapshot acquisition active flag (true/false)
Request serial no.
Start page no.
Last page no.
Extraction-completed page no. for preceding transactions
Extraction-completed page no. for subsequent transactions
Reserved start page no.
Reserved last page no.
Retry page no.

The target resource ID, here, specifies the database of the data extraction target. The setting unit 4 specifies the area of the recording medium 10 in which records of the database specified by the target resource ID are stored, and records the area to the memory 7a as the extraction range. In the example depicted in Table 1, the extraction range is indicated by a start page and a last page. The setting unit 4 sets initial values in the extraction-completed page number for preceding transactions and the extraction-completed page number for subsequent transactions, and sets the numbers of the first and last pages that will form a reserved area for storing records to be inserted in the insert process of a preceding transaction in the reserved start page number and the reserved last page number. For example, a portion of the extraction range between the start page and the last page can be set as the reserved area. A value indicating that extraction retry is not required is recorded in the retry page number as an initial value.

In Op23, the extraction unit 5 references the transaction management information, and judges whether there is a ready subsequent transaction and an active preceding transaction. If this is the case (true at Op23), the extraction unit 5 is able to inhibit the update process by the subsequent transaction until the preceding transaction has ended, and cancel the inhibition after the end of the preceding transaction (Op24). The occurrence of data inconsistencies resulting from the update process of a preceding transaction and the update process of a subsequent transaction, for example, can thereby be suppressed.

The extraction unit 5 updates the extraction-in-progress page in the snapshot information of the memory 7a (Op25). For example, the page number "1" of the first page is recorded in the memory 7a as the extraction-in-progress page number when the extraction process is started. That is, the number of the current reference target page is set as the extraction-in-progress page number.

The extraction unit 5 judges whether a value other than the initial value is set in the retry page number of the snapshot information in the memory 7a (Op26). The retry page number is updated in the case where retry extraction process has been executed in Op57 of FIG. 9, for example. If the retry page number is set, the extraction process is performed again from that retry page number (Op27).

The extraction unit 5 reads the current reference target page to the buffer 7b (Op28), and judges whether there is a provisional record mark in the records on that page, and whether the link is to an area inside the extraction range (Op29). If false at Op29, the record image of the read page is extracted, and recorded to another area (Op30). The other area may, for example, be an area of the memory 7a or an area of the recording medium 10.

Note that by judging in Op29 whether the link of the record for which a provisional record mark is set is inside the extraction range, it can be judged whether the image of the record for which a provisional record mark is set was created during the current snapshot acquisition. For example, the database management apparatus 3a is able to acquire a recovery log capable of recovering a series of processes in readiness for a system crash during processing. In the case where snapshot acquisition is requested again after a crash in this state, the post-update record image preferably is referenced. Thus, a record image for which a provisional record mark has been set in the extraction process is referenced in the case where a record image pointed to by the link information of that record is outside the current extraction range. It can thereby be judged whether a record image for which a provisional record mark is set was created during the current snapshot acquisition.

Figure 11:
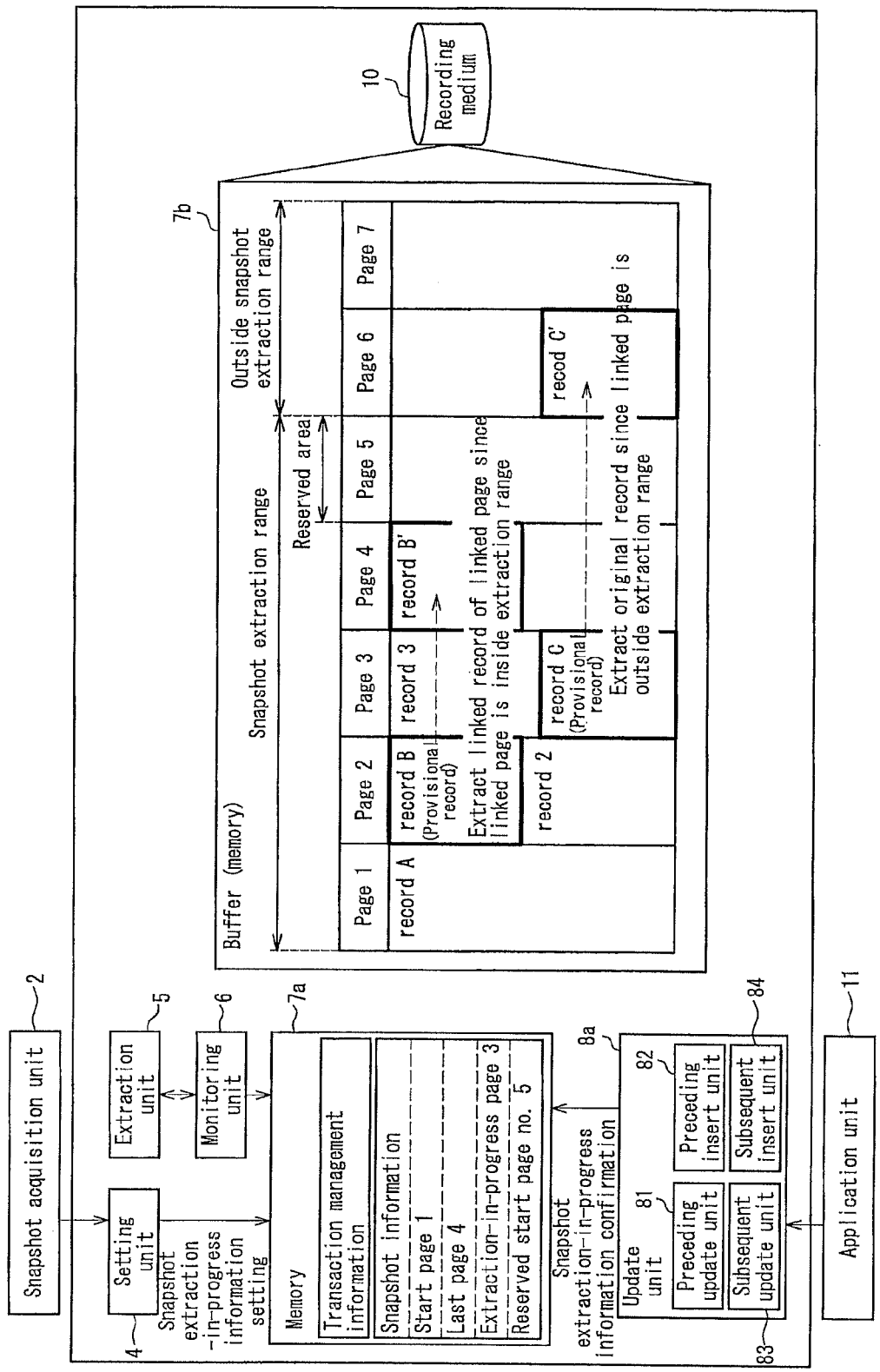
FIG. 11 depicts an example in the case where the links of records for which a provisional record mark is set are respectively inside and outside an extraction range.

FIG. 11 depicts an example in the case where the links of records for which a provisional record mark is set are respectively inside the extraction range and outside the extraction range. In the example depicted in FIG. 11, a record B on page 2 and a record C on page 3 are records for which a provisional record mark is set. The link of the record B is inside the extraction range and the link of the record C is outside the extraction range. In this case, because the link of the record B on page 2 is inside the extraction range, a record B' (linked record) on the linked page 4 is extracted, and the record B, which is the original record, is not extracted. On the other hand, because the link of the record C on page 3 is outside the extraction range, the original record C is extracted.

Figure 12:
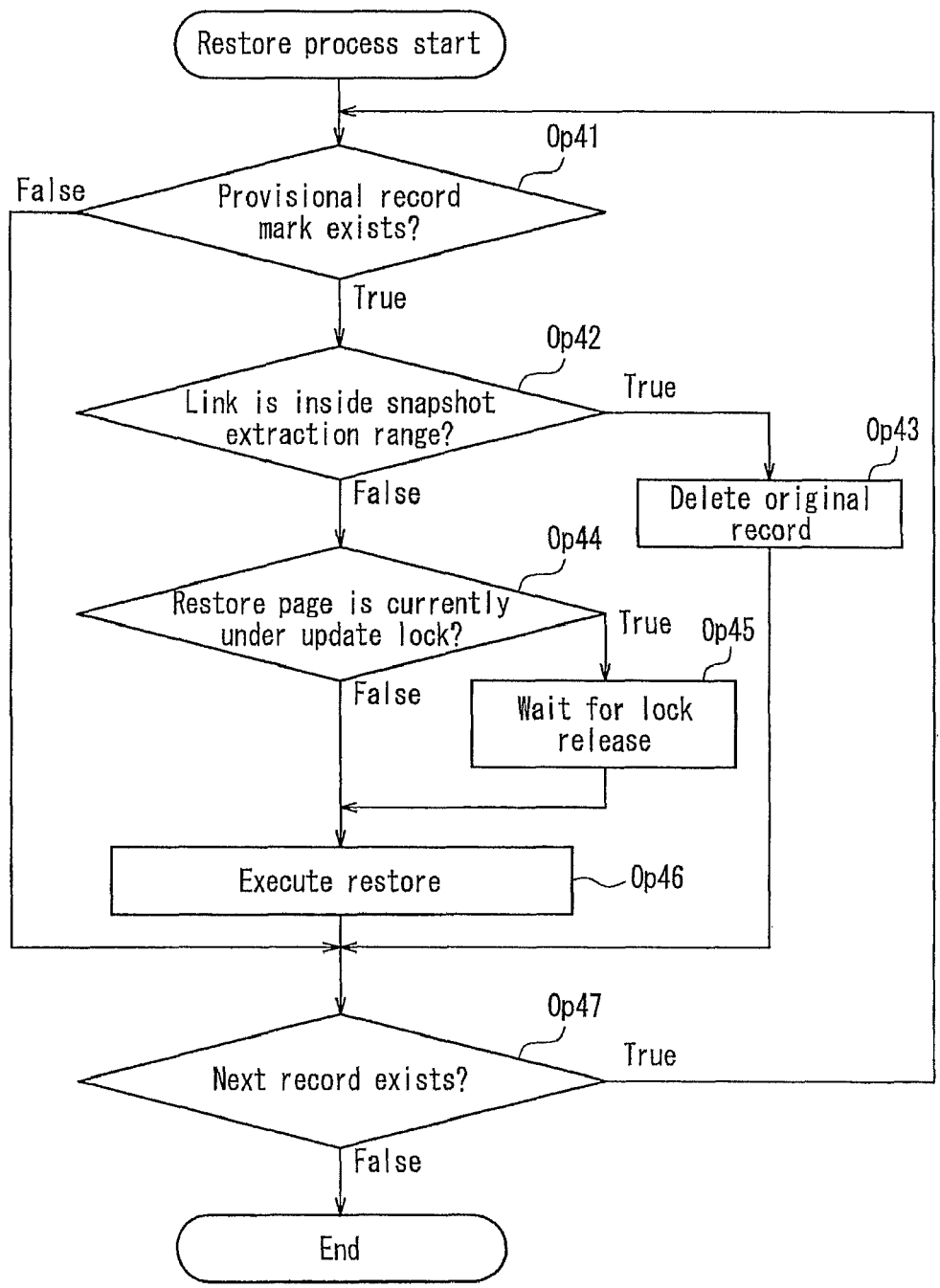
FIG. 12 is a flowchart depicting an example of a restore process.

Once the extraction process for the current reference target page is over, the restore unit 9 executes the restore process for the current reference target page (Op31). The processing of Op 31 is depicted in FIG. 12 and will be discussed in detail later.

The processing of Op 25 to Op31 is repeated for all of the pages in the extraction range (until Op32 is true). When proceeding to the extraction process on the next page, the monitoring unit 6 is able to update the extraction-completed page number for preceding transactions and the extraction-completed page number for subsequent transactions in the memory 7a (Op35).

Note that processing that does not result in an increase in the number of extraction-completed pages for subsequent transactions in the snapshot information may be performed when moving to the extraction process on the next page. The range of the data area that will likely undergo re-extraction can thereby be protected from data update resulting from a subsequent transaction. For example, in the case where re-extraction resulting from the retry process will possibly be required, the data image in the extraction range at the starting point in time preferably is preserved. In this case, keeping the number of extraction-completed pages for subsequent transactions at the initial value (e.g., 0) allows subsequent transactions to always perform the update operation on a map obtained by copying the update target record to an area outside the snapshot extraction range.

Once the extraction process is completed for the entire extraction range, the setting unit 4 deletes the snapshot information (Op33). The extracted record or information indicating the position of that record is output to the source of the snapshot request (here, the snapshot acquisition unit 2) (Op34).

Restore Process

FIG. 12 is a flowchart depicting an example of the restore process in Op31 of FIG. 10. In the example depicted in FIG. 12, the restore unit 9 judges whether a provisional record mark exists (is enabled) with respect to one record on the target page (Op41). If there is not a provisional record mark, the next record is processed. If there is a provisional record mark and the link of that record is inside the snapshot extraction range (true at Op42), that record (i.e., original record) is deleted (Op43). If the link of that record is not inside the snapshot extraction range (false at Op42), it is judged whether the page (restore page) containing the linked record is under update lock (Op44). If the page is under update lock, restore is executed (Op46) after waiting for lock release (Op45). The processing of Op46 can be performed similarly to the first embodiment.

Hardware Configuration

The functions of the functional elements (setting unit 4, extraction unit 5, monitoring unit 6, update units 8 and 8a, restore unit 9) of the database management apparatuses 3 and 3a in the first and second embodiment can be realized by a processor in a computer executing a prescribed program. Thus, a database management program for causing a computer to function as the database management apparatuses 3 and 3a, and a non-transitory recording medium on which the program is recorded are encompassed in the embodiments of the present invention. A non-transitory recording medium does not include a transitory medium such as an actual signal.

Figure 13:
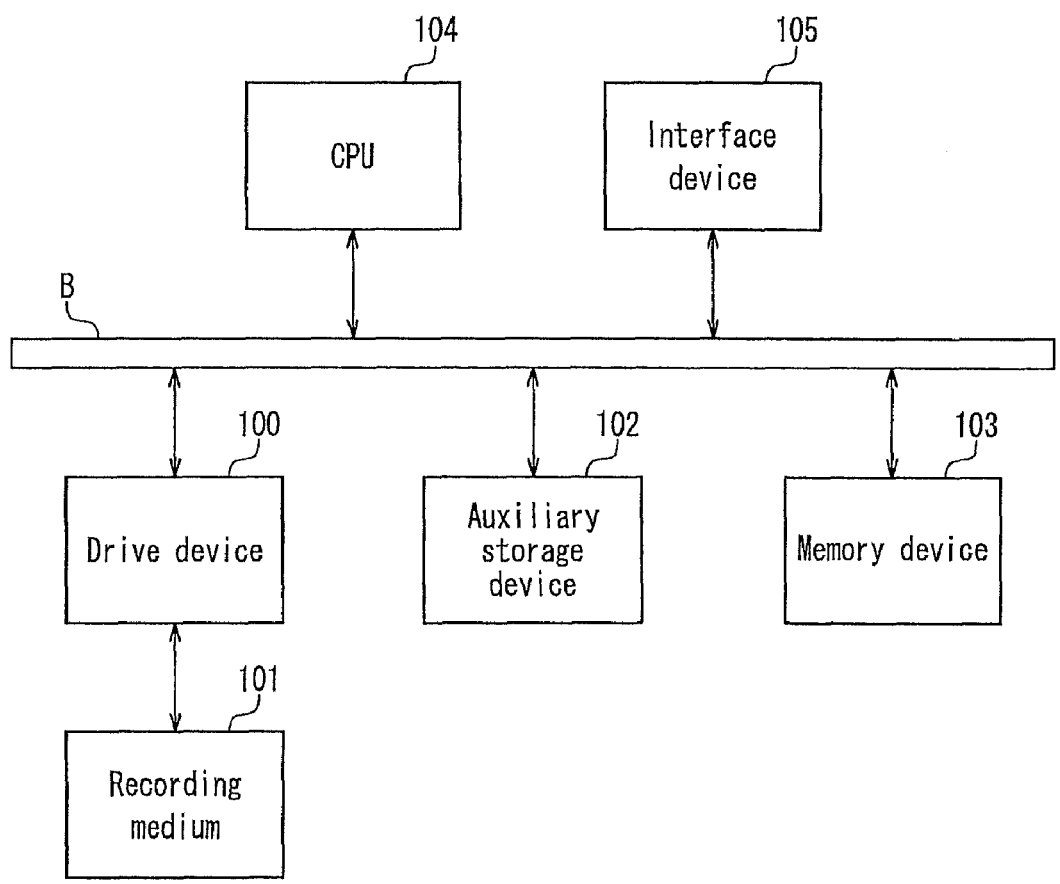
FIG. 13 depicts an exemplary hardware configuration of a database server in the first and second embodiments.

FIG. 13 depicts an exemplary hardware configuration of a database server in the first and second embodiments. In the example depicted in FIG. 13, the database server is provided with a drive device 100, an auxiliary storage device 102, a memory device 103, a CPU 104 and an interface device 105 that are connected to each other via a bus B. A program that causes the CPU 104 to execute processing relating to the database server is provided, for example, by a recording medium 101 such as a CD-ROM. When the recording medium 101 having the program recorded thereon has been set in the drive device 100, the program is installed onto the auxiliary storage device 102 from the recording medium 101 via the drive device 100. The auxiliary storage device 102 stores the installed program. The memory device 103 reads out the program from the auxiliary storage device 102 and stores the read program if a program start instruction is received. The CPU 104 executes processing relating to the database server in accordance with the program stored on the memory device 103. The interface device 105 is used as an interface for connecting to a network. Note that the recording medium 10 storing a database in the above first and second embodiments can be realized by the auxiliary storage device 102 or the memory device 103. The memory 7a, 7b can also be realized by the memory device 103. Thus, a database management apparatus can comprise a processor such as CPU 104 and memory such as memory device 102. The processor can be arranged to read a record in snapshot range on a recording medium such as the auxiliary storage device 102 at a snapshot time point and save the record to another area. One example of the snapshot time is the above mentioned point in time for acquiring the snapshot. One example of the snapshot range is the above mentioned data extraction range. The memory stores the snapshot time point and the snapshot range. The processor is arranged to record, to the memory, information indicating a read-complete area among the snapshot range and a read-remaining area among the snapshot range on a timely basis. One example of the read-complete area is the extraction-completed area. One example of the read-remaining area is the extraction-remaining area. The processor receives an instruction to update a target record inside the snapshot range. One example of the instruction is the snapshot request. The processor compares a start point of a transaction of the instruction and the snapshot time point stored in the memory. Thereby the processor can judge that the transaction is stared after the snapshot time point or before the snapshot time point, namely that the transaction is a preceding transaction or a subsequent transaction. The processor judges whether the target record is in the read-complete area or in the read-remaining area, and control the process of updating the target record according to the result of the comparing and the judging.

Effects and Related Matters

According to the above embodiments, the range of an area in which data targeted for a snapshot is stored is determined in advance, enabling transaction consistency to be realized, focusing on data in that range. Particularly in the case where the transactions (update tasks) competing with the snapshot process mainly involve the INSERT process, use of computer resources and the task load on the system administrator can be further decreased. In addition, by only managing multiple records at times at which snapshot acquisition is required, constriction of disk capacity can also be avoided. As a result, the snapshot acquisition function can be simply installed compared with the conventional techniques, by using the snapshot creation technique according to the above embodiments.

For example, UNDO logging requires that an area for logging be secured on a recording medium, but with the above embodiments, an area for logging is either not required or minimized. Also, MVCC, in which maps are stored whenever records are updated in time-series, and database duplication schemes require a data area for mapping or duplication, but with the above embodiments, such an area is either not required or minimized. Further, both UNDO logging and MVCC require design and maintenance tasks by a system administrator, but with the above embodiments, special considerations for snapshot acquisition are either not required or minimized According to the disclosure of the present specification, computer resources and the operational management of users can be reduced in snapshot acquisition on a database.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

The invention claimed is:

1. A computer-readable non-transitory medium having recorded thereon a database management program for causing a computer to execute:
    a setting process of receiving a snapshot request requesting that a record in a database on a recording medium at a designated point in time be extracted and saved to another area, and recording information indicating an extraction range of data to be extracted in the recording medium to a memory;
    an extraction process of sequentially extracting records inside the extraction range, and recording the extracted records to the other area;
    a monitoring process of recording information indicating an extraction-completed area with respect to which record extraction in the extraction range in the extraction process has been completed and an extraction-remaining area with respect to which record extraction in the extraction range has yet to be performed to the memory on a timely basis;
    a subsequent update process of judging, in a case where an instruction to update a record inside the extraction range by a subsequent transaction started after the designated point in time is received during the extraction process, whether the record targeted by the update instruction is in the extraction-completed area or in the extraction-remaining area with reference to the memory, and, if the update target record is in the extraction-completed area, updating the update target record in the extraction-completed area, and, if the update target record is in the extraction-remaining area, recording a map of the update target record in the extraction-remaining area to an area outside the extraction range and updating the map; and
    a restore process of updating the update target record inside the extraction range to be the same as the map recorded and updated outside the extraction range, after the update target record inside the extraction range has been extracted in the extraction process.

2. The computer-readable non-transitory medium according to claim 1, wherein the database management program further causes the computer to execute:
    a preceding update process of judging, in a case where an instruction to update a record inside the extraction range by a preceding transaction started before the designated point in time is received during the extraction process, whether the record targeted by the update instruction is in the extraction-completed area or in the extraction-remaining area with reference to the memory, and, if the update target record is in the extraction-remaining area, updating the update target record, and, if the update target record is in the extraction-completed area, updating the update target record and further recording information indicting an area containing the updated record to the memory as retry area information; and
    a re-extraction process of again extracting, in a case where the retry area information has been recorded to the memory in the preceding update process, a record from the area indicated by the retry area information and recording the extracted record to the other area.

3. The computer-readable non-transitory medium according to claim 2, wherein the preceding update process includes a process of updating the update target record after having prohibited extraction of the update target record by the extraction process, in the case where the update target record is a record in the extraction-remaining area.

4. The computer-readable non-transitory medium having recorded thereon the database management program according to claim 1, wherein the database management program further causes the computer to execute:
    a preceding update process of judging, in a case where an instruction to update a record inside the extraction range by a preceding transaction started before the designated point in time is received, whether the record targeted by the update instruction is in the extraction-completed area or in the extraction-remaining area with reference to the memory, and, if the update target record is in the extraction-remaining area, updating the update target record, and, if the update target record is in the extraction-completed area, canceling an update process relating to the update instruction.

5. The computer-readable non-transitory medium according to claim 4, wherein the preceding update process includes a process of updating the update target record after having prohibited extraction of the update target record by the extraction process, in the case where the update target record is a record in the extraction-remaining area.

6. The computer-readable non-transitory medium according to claim 1, wherein at the extraction process, in a case where a record inside the extraction range is currently being updated by a preceding transaction started before the designated point in time, the extraction process is executed after waiting for the preceding transaction to end.

7. The computer-readable non-transitory medium according to claim 1,
    wherein the setting process further records information indicating a reserved area for inserting a record into the extraction range during the extraction process, in addition to the information indicating the extraction range,
    the database management program causes the computer further to execute a preceding insert process that, in a case where an instruction to insert a record by a preceding transaction started before the designated point in time is received during the extraction process, records the record targeted by the insert instruction to the reserved area, and the extraction process further extracts the inserted record recorded in the reserved area.

8. The computer-readable non-transitory medium according to claim 1, wherein the database management program causes the computer further to execute a subsequent insert process that, in a case where an instruction to insert a record by a subsequent transaction started after the designated point in time is received during the extraction process, records the record targeted by the insert instruction into an area outside the extraction range.

9. The computer-readable non-transitory medium according to claim 1, wherein the restore process including a process of releasing the area in which the map is recorded outside the extraction range, after the update target record inside the extraction range has been updated to be the same as the map.

10. A database management apparatus comprising:
a setting unit that receives a snapshot request requesting that a record in a database on a recording medium at a designated point in time be extracted and saved to another area, and records information indicating an extraction range of data to be extracted in the recording medium to a memory;
an extraction unit that sequentially extracts records inside the extraction range, and records the extracted records to the other area;
a monitoring unit that records information indicating an extraction-completed area with respect to which record extraction in the extraction range by the extraction unit has been completed and an extraction-remaining area with respect to which record extraction in the extraction range has yet to be performed to the memory on a timely basis;
a subsequent update unit that judges, in a case where an instruction to update a record inside the extraction range by a subsequent transaction started after the designated point in time is received during the extraction process by the extraction unit, whether the record targeted by the update instruction is in the extraction-completed area or in the extraction-remaining area with reference to the memory, and, if the update target record is in the extraction-completed area, updates the update target record in the extraction-completed area, and, if the update target record is in the extraction-remaining area, records a map of the update target record in the extraction-remaining area to an area outside the extraction range and updates the map; and
a restore unit that updates the update target record inside the extraction range to be the same as the map recorded and updated outside the extraction range, after the update target record inside the extraction range has been extracted by the extraction unit.

11. The database management apparatus according to claim 10, further comprising a preceding update unit that judges, in a case where an instruction to update a record inside the extraction range by a preceding transaction started before the designated point in time is received during the extraction process, whether the record targeted by the update instruction is in the extraction-completed area or in the extraction-remaining area with reference to the memory, and, if the update target record is in the extraction-remaining area, updates the update target record, and, if the update target record is in the extraction-completed area, updates the update target record and further records information indicting an area containing the updated record to the memory as retry area information,
wherein the extraction unit, in a case where the retry area information has been recorded to the memory by the preceding update unit, further executes a re-extraction process of again extracting a record from the area indicated by the retry area information and recording the extracted record to the other area.

12. The database management apparatus according to claim 10, further comprising a preceding update unit that judges, in a case where an instruction to update a record inside the extraction range by a preceding transaction started before the designated point in time is received during the extraction process, whether the record targeted by the update instruction is in the extraction-completed area or in the extraction-remaining area with reference to the memory, and, if the update target record is in the extraction-remaining area, updates the update target record, and, if the update target record is in the extraction-completed area, cancels an update process relating to the update instruction.

13. A database management method for being executed by a computer, the method comprising:
a setting process of receiving a snapshot request requesting that a record in a database on a recording medium at a designated point in time be extracted and saved to another area, and recording information indicating an extraction range of data to be extracted in the recording medium to a memory;
an extraction process of sequentially extracting records inside the extraction range, and recording the extracted records to the other area;
a monitoring process of recording information indicating an extraction-completed area with respect to which record extraction in the extraction range in the extraction process has been completed and an extraction-remaining area with respect to which record extraction in the extraction range has yet to be performed to the memory on a timely basis;
a subsequent update process of judging, in a case where an instruction to update a record inside the extraction range by a subsequent transaction started after the designated point in time is received during the extraction process, whether the record targeted by the update instruction is in the extraction-completed area or in the extraction-remaining area with reference to the memory, and, if the update target record is in the extraction-completed area, updating the update target record in the extraction-completed area, and, if the update target record is in the extraction-remaining area, recording a map of the update target record in the extraction-remaining area to an area outside the extraction range and updating the map; and
a restore process of updating the update target record inside the extraction range to be the same as the map recorded and updated outside the extraction range, after the update target record inside the extraction range has been extracted in the extraction process.

14. A database management apparatus comprising:
a processor to read an record in a snapshot range from a recording medium at a snapshot time point and save the record to another area,
a memory to store data indicating the snapshot time point and the snapshot range,
wherein the processor is arranged to record, to the memory, information indicating a read-complete area among the snapshot range and a read-remaining area among the snapshot range on a timely basis,
to receive an instruction to update a target record inside the snapshot range,
to compare a start point of a transaction of the instruction and the snapshot time point indicated by the data stored in the memory,
to judge that the target record is in the read-complete area or in the read-remaining area, and
to control the process of updating the target record according to the result of the comparing and the judging.

* * * * *

UNITED STATES PATENT AND TRADEMARK OFFICE
CERTIFICATE OF CORRECTION

PATENT NO. : 8,315,987 B2
APPLICATION NO. : 13/036136
DATED : November 20, 2012
INVENTOR(S) : Masaki Nishigaki Page 1 of 1

It is certified that error appears in the above-identified patent and that said Letters Patent is hereby corrected as shown below:

Column 20, Line 20, In Claim 2, delete "indicting" and insert -- indicating --, therefor.
Column 22, Line 7, In Claim 11, delete "indicting" and insert -- indicating --, therefor.

Signed and Sealed this
Second Day of April, 2013

Teresa Stanek Rea
*Acting Director of the United States Patent and Trademark Office*